(12) United States Patent
Harada et al.

(10) Patent No.: US 12,113,212 B2
(45) Date of Patent: Oct. 8, 2024

(54) ACTIVE MATERIAL, ELECTRODE, SECONDARY BATTERY, BATTERY PACK, AND VEHICLE

(71) Applicant: KABUSHIKI KAISHA TOSHIBA, Tokyo (JP)

(72) Inventors: Yasuhiro Harada, Isehara (JP); Yoshiaki Murata, Kawasaki (JP); Kazuki Ise, Kawasaki (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 44 days.

(21) Appl. No.: 17/650,784

(22) Filed: Feb. 11, 2022

(65) Prior Publication Data

US 2023/0071491 A1    Mar. 9, 2023

(30) Foreign Application Priority Data

Sep. 8, 2021 (JP) .................. 2021-146172

(51) Int. Cl.
*H01M 4/485* (2010.01)
*H01M 4/02* (2006.01)

(52) U.S. Cl.
CPC ...... *H01M 4/485* (2013.01); *H01M 2004/027* (2013.01); *H01M 2220/20* (2013.01)

(58) Field of Classification Search
CPC .... C01G 33/00; C01G 23/002; C01G 23/003; C01P 2002/74; C01P 2002/77;
(Continued)

(56) References Cited

U.S. PATENT DOCUMENTS 10,862,118 B2    12/2020  Harada et al.
2019/0296343 A1*  9/2019  Harada .................. H01M 4/366

FOREIGN PATENT DOCUMENTS

EP    2 784 858 A2    10/2014
JP    2019-169343 A    10/2019

OTHER PUBLICATIONS

Gasperin, "Affinement de la Structure TiNb$_2$O$_7$ et Repartition des Cations", Journal of Solid State Chemistry, vol. 53, Issue 1, Jun. 1984, 4 pages.

* cited by examiner

*Primary Examiner* — Mayla Gonzalez Ramos
*Assistant Examiner* — Bethany C Garcia
(74) *Attorney, Agent, or Firm* — Oblon, McClelland, Maier & Neustadt, L.L.P.

(57) ABSTRACT

According to one embodiment, provided is an active material including a crystal particle that includes a niobium-titanium composite oxide. A ratio $A_{Nb}/A_{Ti}$ of a Nb abundance $A_{Nb}$ to a Ti abundance $A_{Ti}$ in the crystal particle satisfies $2.3 \leq A_{Nb}/A_{Ti} \leq 4.0$. According to a powder X-ray diffraction spectrum using a Cu-Kα ray for the crystal particle, an intensity ratio $I_\beta/I_\alpha$ of a peak intensity $I_\beta$ of a peak β appearing at $12.5° \leq 2\theta \leq 13.0°$ to a peak intensity $I_\alpha$ of a peak α appearing at $8.5° \leq 2\theta \leq 9.0°$ is within a range of $0.1 < I_\beta/I_\alpha \leq 2.0$.

12 Claims, 8 Drawing Sheets

(58) Field of Classification Search
CPC .............. C01P 2004/82; C01P 2006/12; C01P 2002/72; C01P 2002/76; C01P 2002/30; C01P 2002/70; C01P 2004/61; C01P 2004/03; C01P 2004/54; C01P 2004/60; C01P 2006/40; H01M 4/485; H01M 10/0525; H01M 2004/027; H01M 2220/20; H01M 4/131; H01M 4/634; H01M 4/366; H01M 4/505; H01M 4/525; H01M 2004/021; H01M 10/052; H01M 10/425; H01M 10/054; H01M 10/056; Y02E 60/10; B60L 50/64; B60L 3/0046; Y02T 10/70; Y02T 10/7072

See application file for complete search history.

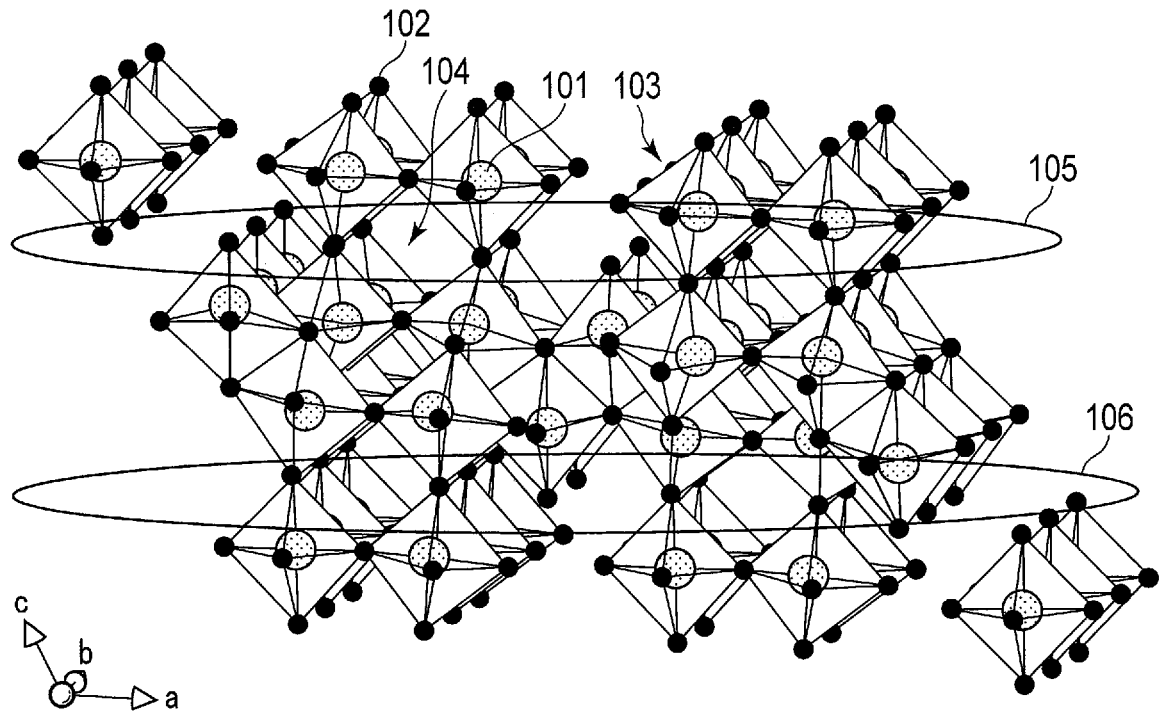
F I G. 1
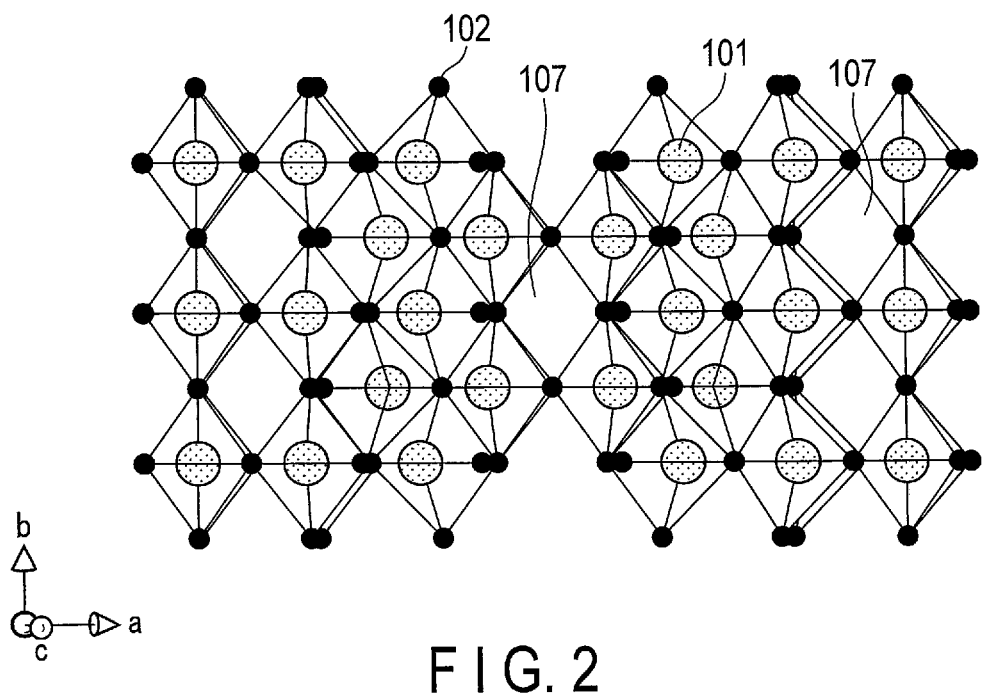
F I G. 2

… (1)

ACTIVE MATERIAL, ELECTRODE, SECONDARY BATTERY, BATTERY PACK, AND VEHICLE

CROSS-REFERENCE TO RELATED APPLICATION

This application is based upon and claims the benefit of priority from Japanese Patent Application No. 2021-146172, filed Sep. 8, 2021, the entire contents of which are incorporated herein by reference.

FIELD

Embodiments relate to an active material, electrode, secondary battery, battery pack, and vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid electric automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well. For example, not only is the charging time remarkably shortened in a secondary battery capable of rapid charge and discharge, but the battery is also capable of improving motive performances in vehicles such as hybrid electric automobiles, and efficient recovery of regenerative energy of motive force.

Rapid charge and discharge is capable when electrons and lithium ions can migrate rapidly between the positive electrode and the negative electrode. However, when a battery using a carbon-based negative electrode is repeatedly subjected to rapid charge and discharge, precipitation of dendrite of metallic lithium on the electrode may sometimes occur, raising concern of heat generation or ignition due to internal short circuits.

In light of this, a battery using a metal composite oxide in a negative electrode in place of a carbonaceous material has been developed. In particular, in a battery using an oxide of titanium in the negative electrode, rapid charge and discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium for the negative electrode has a problem that the energy density is low.

For example, the electrode potential of an oxide of titanium is about 1.5 V (vs. Li/Li$^+$) relative to metallic lithium, which is higher (i.e., more noble) in comparison to potentials of carbon based negative electrodes. The potential of an oxide of titanium is attributed to the redox reaction between Ti$^{3+}$ and Ti$^{4+}$ upon electrochemical insertion and extraction of lithium, and is therefore electrochemically restricted. It is also a fact that rapid charge/discharge of lithium ions can be performed stably at a high electrode potential of about 1.5 V (vs. Li/Li$^+$). Conventionally, it has therefore been difficult to drop the potential of the electrode in order to improve the energy density.

On one hand, considering the capacity per unit weight, the theoretical capacity of titanium dioxide (anatase structure) is about 165 mAh/g, and the theoretical capacity of spinel type lithium-titanium composite oxides such as Li$_4$Ti$_5$O$_{12}$ is about 180 mAh/g. On the other hand, the theoretical capacity of a general graphite based electrode material is 385 mAh/g and greater. As such, the capacity density of an oxide of titanium is significantly lower than that of the carbon based negative electrode material. This is due to there being only a small number of lithium-insertion sites in the crystal structure, and lithium tending to be stabilized in the structure, and thus, substantial capacity being reduced.

In consideration of the above circumstances, a new electrode material containing Ti and Nb has been studied. Such a niobium-titanium composite oxide material is expected to have a high charge/discharge capacity. In particular, a composite oxide represented by Nb$_2$TiO$_7$ has a high theoretical capacity exceeding 380 mAh/g. Therefore, the niobium-titanium composite oxide is expected as a high-capacity material in place of Li$_4$Ti$_5$O$_{12}$. However, whilst the niobium-titanium composite oxide exhibits excellent input performance, the output performance thereof is low, and therefore, there is a problem that balance in input-output performance is poor.

BRIEF DESCRIPTION OF THE DRAWINGS

FIG. 1 is a schematic view illustrating a crystal structure of a niobium-titanium composite oxide Nb$_2$TiO$_7$;

FIG. 2 is a schematic view illustrating the crystal structure of FIG. 1 from another direction;

DETAILED DESCRIPTION

Figure 3:
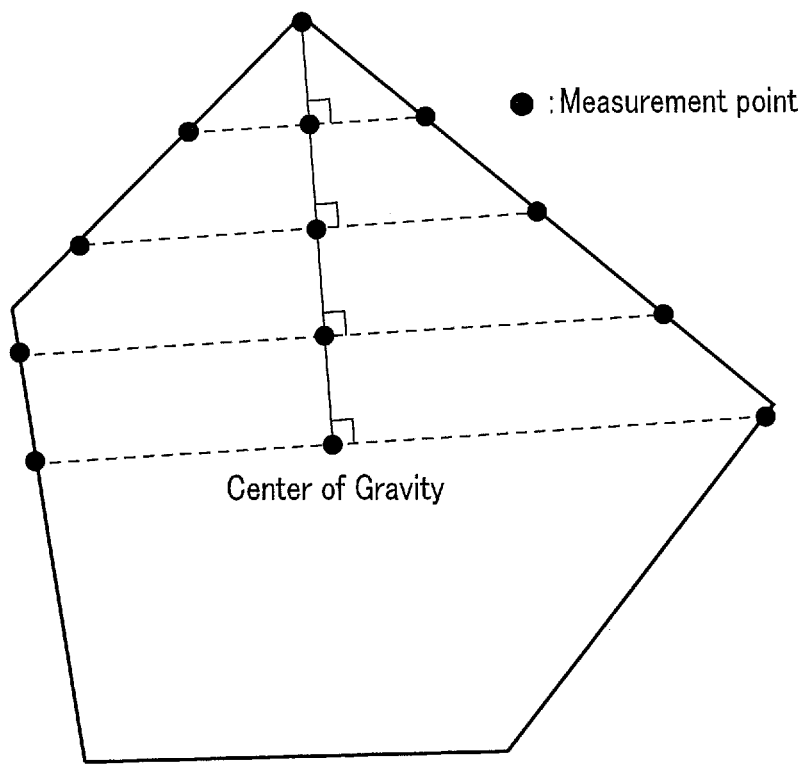
FIG. 3 is a plan view schematically illustrating a particle to be measured in a transmission electron microscope (TEM) observation.

According to one embodiment, provided is an active material including a crystal particle that includes a niobium-titanium composite oxide. A ratio $A_{Nb}/A_{Ti}$ of a Nb abundance $A_{Nb}$ to a Ti abundance $A_{Ti}$ in the crystal particle satisfies $2.3 \leq A_{Nb}/A_{Ti} \leq 4.0$. According to a powder X-ray diffraction spectrum using a Cu-Kα ray for the crystal particle, an intensity ratio $I_β/I_α$ of a peak intensity $I_β$ of a peak β appearing at 12.5°≤2θ≤13.0° to a peak intensity $I_α$ of a peak α appearing at 8.5°≤2θ≤9.0° is within a range of 0.1<$I_β/I_α$≤2.0.

According to another embodiment, provided is an electrode including the above active material.

According to a further other embodiment, provided is a secondary battery including a negative electrode, a positive electrode, and an electrolyte. The negative electrode includes the above electrode.

According to a still another embodiment, provided is a battery pack including the above secondary battery.

In addition, according an embodiment, provided is a vehicle including the above battery pack.

Hereinafter, embodiments will be described with reference to the drawings. The same reference signs are applied to common components throughout the embodiments and overlapping explanations are omitted. Each drawing is a schematic view for explaining the embodiment and promoting understanding thereof; though there may be differences in shape, size and ratio from those in an actual device, such specifics can be appropriately changed in design taking the following explanations and known technology into consideration.

First Embodiment

According to a first embodiment, an active material is provided. The active material includes a crystal particle including a niobium-titanium composite oxide. A ratio $A_{Nb}/A_{Ti}$ of a Nb abundance $A_{Nb}$ to a Ti abundance ratio $A_{Ti}$ within the crystal particle satisfies 2.3≤$A_{Nb}/A_{Ti}$≤4.0. Moreover, in a powder X-ray diffraction spectrum using a Cu-Kα ray for the crystal particle, a peak appearing at 8.5°≤2θ≤9.0° is taken as peak α, and a peak appearing at 12.50°≤2θ≤13.0° is taken as peak β. An intensity ratio $I_β/I_α$ of a peak intensity $I_β$ of peak β to a peak intensity $I_α$ of peak is within a range of 0.1<$I_β/I_α$≤2.0.

The active material may be an active material for a battery. The active material may be, for example, an electrode active material used in an electrode of secondary battery such as a lithium ion battery, a nonaqueous electrolyte battery, and the like. More specifically, the active material may be, for example, a negative electrode active material used in the negative electrode of a secondary battery.

The above-described active material can realize a secondary battery that can have balanced input/output performance, and exhibit excellent cycle life performance while maintaining a high energy density similar to that of a battery using a composite oxide represented by $Nb_2TiO_7$ as an electrode material. The reason for that will be described below.

The active material includes a $Nb_2TiO_7$-type crystal phase and a $Nb_{10}Ti_2O_{29}$-type crystal phase. Hereinafter, the former $Nb_2TiO_7$-type crystal phase may be referred to as an A-type niobium-titanium composite oxide phase, and the latter $Nb_{10}Ti_2O_{29}$-type crystal phase may be referred to as a B-type niobium-titanium composite oxide phase. The active material satisfies the abundance ratio of the Nb element and the Ti element as represented by the following Formula (1) and the peak intensity ratio represented by the following Formula (2):

$$2.3 \leq A_{Nb}/A_{Ti} \leq 4.0 \quad (1)$$

$$0.1 < I_β/I_α \leq 2.0 \quad (2)$$

In Formula (1), $A_{Nb}$ represents the abundance of Nb, and $A_{Ti}$ represents the abundance of Ti;

In Formula (2), $I_α$ represents a peak intensity having the maximum intensity of a peak α that appears at 2θ within a range of 8.5°≤2θ≤9.0° in a diffraction spectrum by wide-angle X-ray diffraction method with an X-ray source of Cu-Kα rays, and $I_β$ represents a peak intensity having the maximum intensity of a peak β that appears at 2θ within a range of 12.5°≤2θ≤13.0° in the diffraction spectrum.

The peak α in the X-ray diffraction spectrum for the active material is attributed to the A-type niobium-titanium composite oxide phase ($Nb_2TiO_7$-type crystal phase A). The peak β in the spectrum is attributed to the B-type niobium-titanium composite oxide phase ($Nb_{10}Ti_2O_{29}$-type crystal phase B).

In the active material, the A-type niobium-titanium composite oxide phase and the B-type niobium-titanium composite oxide phase are mixed within each crystal particle.

It is desirable that the mixing ratio of the A-type niobium-titanium composite oxide phase to the B-type niobium-titanium composite oxide phase in the crystal particle satisfies the following Formula (3):

$$0.5 \leq M_A/M_B \leq 2.5 \quad (3)$$

In Formula (3), $M_A$ represents the proportion of mass of the A-type niobium-titanium composite oxide phase within the crystal particle, and $M_B$ represents the proportion of mass of the B-type niobium-titanium composite oxide phase within the crystal particle.

The A-type niobium-titanium composite oxide phase, which is a $Nb_2TiO_7$-type crystal phase, will be described.

$Nb_2TiO_7$ is exemplified as a representative composition of the A-type niobium-titanium composite oxide phase contained in the active material according to the embodiment. Although the composition of the niobium-titanium composite oxide is not limited thereto, the oxide preferably has a crystal structure having a symmetry of the space group C2/m and an atomic coordination described in Journal of Solid-State Chemistry 53, pp. 144-147 (1984).

The niobium-titanium composite oxide primarily exhibits a monoclinic crystal structure. As an example, a schematic diagram of the crystal structure of monoclinic $Nb_2TiO_7$ is shown in FIGS. 1 and 2.

As illustrated in FIG. 1, in the crystal structure of monoclinic $Nb_2TiO_7$, metal ions 101 and oxide ions 102 are included in skeletal structure portions 103. At the positions of metal ions 101, Nb ions and Ti ions are randomly arranged at a ratio of Nb:Ti=2:1. Such skeletal structure portions 103 are alternately arranged three-dimensionally, whereby vacancies 104 are formed among skeletal structure portions 103. These vacancies 104 serve as hosts for lithium ions. Lithium ions can be inserted into this crystal structure from 0 moles up to a maximum of 5.0 moles. Therefore, the composition having from 0 to 5.0 moles of lithium ions inserted can be represented by $Li_xNb_2TiO_7$ (0≤x≤5).

In FIG. 1, regions 105 and 106 are parts having two-dimensional channels in [100] and [010] directions. As illustrated in FIG. 2, the crystal structure of monoclinic $Nb_2TiO_7$ has vacancies 107 along a [001] direction. This vacancy 107 has a tunnel structure advantageous to the conduction of lithium ions and serves as an ion conduction path in the [001] direction connecting region 105 and region 106. The presence of this ion conduction path enables for lithium ions to migrate back and forth between regions 105 and 106. Furthermore, the niobium-titanium composite oxide has a lithium insertion potential of about 1.5 V (vs. Li/Li$^+$). Therefore, an electrode including the niobium-titanium composite oxide as an active material can realize a battery in which repeated rapid charge/discharge can be stably performed.

Furthermore, in the above-described crystal structure, when lithium ions are inserted into vacancies 104, metal ions 101 that compose the skeleton are reduced to the trivalent state, whereby the electrical neutrality of the crystal is maintained. In the niobium-titanium composite oxide, not only Ti ions are reduced from the tetravalent to the trivalent state, but also Nb ions are reduced from the pentavalent to the trivalent state. For this reason, the number of reduced valences per active material weight is large. Therefore, the niobium-titanium composite oxide can maintain the electrical neutrality of the crystal even when many lithium ions are inserted. For this reason, the niobium-titanium composite oxide has an energy density higher than that of a compound such as titanium oxide that only contains tetravalent cations. In addition, the A-type niobium-titanium composite oxide phase ($Nb_2TiO_7$-type phase) is superior in weight energy density as compared to the B-type niobium-titanium composite oxide phase ($Nb_{10}Ti_2O_{29}$-type phase) described later. This is because the number of Nb atoms contained in one mole of the $Nb_{10}Ti_2O_{29}$-type crystal phase is large, that is, the weight per mole thereof is large.

Next, the B-type niobium-titanium composite oxide phase, which is a $Nb_{10}Ti_2O_{29}$-type crystal phase, will be described.

The basic skeletal structure of the B-type niobium-titanium composite oxide phase is a structure similar to the crystal structure of the monoclinic $Nb_2TiO_7$ illustrated in FIGS. 1 and 2. When lithium ions are inserted into vacancies 104, metal ions 101 that compose the skeleton are reduced to the trivalent state, whereby the electrical neutrality of the crystal is maintained. The composition, when lithium ions are inserted into the $Nb_{10}Ti_2O_{29}$-type crystal phase, can be represented by $Li_yNb_{10}Ti_2O_{29}$ (0≤y≤22).

In the $Nb_{10}Ti_2O_{29}$ type crystal phase containing many niobium, the amount of Nb ions reduced from the pentavalent to the trivalent state is larger than that in the $Nb_2TiO_7$-type crystal phase. For this reason, the number of reduced valences per mole of the active material is large. Therefore, the niobium-titanium composite oxide can maintain the electrical neutrality of the crystal even when many lithium ions are inserted. Therefore, the B-type niobium-titanium composite oxide phase can more stably maintain the crystal structure when lithium ions are inserted as compared with the A-type niobium-titanium composite oxide phase. As a result, lithium ions diffuse fast, and the life can be extended even when rapid charge/discharge is repeated. That is, the B-type niobium-titanium composite oxide phase is superior in input/output performance and cycle life performance.

On the other hand, the number of reduced valences per active material weight of the $Nb_{10}Ti_2O_{29}$-type crystal phase is smaller than that of the $Nb_2TiO_7$-type crystal phase. That is, since the weight of one mole of the B-type niobium-titanium composite oxide phase is large, the weight energy density thereof is less than that of the A-type niobium-titanium composite oxide phase.

Therefore, the B-type niobium-titanium composite oxide phase ($Nb_{10}Ti_2O_{29}$-type phase) enables the migration speed of lithium ions in the crystal to be enhanced, and the A-type niobium-titanium composite oxide phase ($Nb_2TiO_7$-type phase) enables the weight energy density to be increased. Therefore, by uniformly distributing each of the B-type niobium-titanium composite oxide phase and the A-type niobium-titanium composite oxide phase within the same particle, both of the above-described performances can be achieved.

Here, the uniform distribution of both phases refers to a state in which a boundary or the like between the phases is not observed within the primary particle of the active material. In a crystal particle having a uniform distribution for either crystal phase, each phase may be in a state of being homogenized at a molecular level or an atomic level within the particle. In a case where there is a boundary point such as an interpenetration point between $Nb_{10}Ti_2O_{29}$-type crystal phase and $Nb_2TiO_7$-type crystal phase within the same particle, that is, in a case where there is an inhomogeneity in the crystal phases, the exchange of lithium ions between different crystal phases is rate-limiting. In particular, in lithium extraction (discharge), a variation in lattice volume tends to cause lattice mismatch, and the migration of lithium ions is likely to be hindered.

As described above, the crystal particle of niobium-titanium composite oxide included in the active material according to the embodiment satisfies the abundance ratio of the Nb element and Ti element represented by Formula (1): $2.3 \le A_{Nb}/A_{Ti} \le 4.0$, and exhibits an X-ray diffraction spectrum that satisfies the peak intensity ratio represented by Formula (2): $0.1 < I_\beta/I_\alpha \le 2.0$. The active material may be a batch containing plural of the above-described crystal particles, for example, an active material in powder form, and each of the crystal particles satisfies each of the above-described Formulae (1) and (2).

The symbol $A_{Nb}/A_{Ti}$ in Formula (1) is a molar ratio of the Nb abundance ratio $A_{Nb}$ to the Ti abundance ratio $A_{Ti}$ contained in the crystal particle. An $A_{Nb}/A_{Ti}$ ratio of 2.3 or greater indicates that the B-type niobium-titanium composite oxide phase ($Nb_{10}Ti_2O_{29}$-type crystal phase) is stably generated. With the $Nb_{10}Ti_2O_{29}$-type crystal phase stably generated, high input/output performance can be exhibited. An $A_{Nb}/A_{Ti}$ ratio of 4.0 or less indicates that the A-type niobium-titanium composite oxide phase ($Nb_2TiO_7$-type crystal phase) is stably generated. With the $Nb_2TiO_7$-type crystal phase stably generated, a high energy density can be exhibited.

The peak intensity $I_\alpha$ is the peak intensity (peak height) of the peak α attributed to the ($Nb_2TiO_7$-type) A-type niobium-titanium composite oxide phase in the X-ray diffraction spectrum. The peak α is the peak having the maximum peak intensity within the range where 2θ is $8.5° \le 2\theta \le 9.0°$ in a spectrum measured by the wide-angle X-ray diffraction method described later.

The peak intensity $I_\beta$ is the peak intensity (peak height) of the peak β attributed to the ($Nb_{10}Ti_2O_{29}$-type) B-type niobium-titanium composite oxide phase in the X-ray diffraction spectrum. The peak β is the peak having the maximum peak intensity within a range where 2θ is $12.5° \le 2\theta \le 13.0°$ in the spectrum measured by the wide-angle X-ray diffraction method described later.

As described above, with the A-type niobium-titanium composite oxide phase and the B-type niobium-titanium composite oxide phase uniformly distributed within the crystal particle of the active material, the active material exhibits enhanced input/output performance and cycle performance. The peak intensity ratio $I_\beta/I_\alpha$ exceeding 0.1 means that the B-type niobium-titanium composite oxide phase has an excellent crystallinity. When the peak intensity ratio $I_\beta/I_\alpha$ is 0.1 or less, it means that the crystallinity of the $Nb_{10}Ti_2O_{29}$ type phase is remarkably low. The peak intensity ratio $I_\beta/I_\alpha$ within a range of more than 0.1 and 2.0 or less suggests that the A type and the B type ($Nb_2TiO_7$-type and $Nb_{10}Ti_2O_{29}$-type) niobium-titanium composite oxide phases coexist and are uniformly distributed within the particle. In contrast, when the peak intensity ratio $I_\beta/I_\alpha$ is larger than 2.0, it is suggested that the A-type phase and the B-type phase are not uniformly distributed within the active material particle. This is because, when there is a clear boundary between respective phases or an inhomogeneity of the phases in the particle, an influence of the particle orientation appears in the wide-angle X-ray diffraction pattern described later, and the obtained spectrum deviates from the range of the peak intensity ratio described above.

The active material preferably further satisfies the above-described Formula (3): $0.5 \leq M_A/M_B \leq 2.5$. When the mass ratio $M_A/M_B$ is 0.5 or greater, the relative amount of the A-type niobium-titanium composite oxide phase, which is excellent in terms of capacity density, contained in the active material is large. Therefore, the active material capacity increases, and a high energy density is easily obtained. When the mass ratio $M_A/M_B$ is kept within 2.5 or less, the relative amount of the B-type niobium-titanium composite oxide phase, which is excellent in terms of diffusion of lithium ions, contained in the active material is large, and hence excellent input/output performance is easily obtained. In addition, when the mass ratio $M_A/M_B$ is 0.5 or greater and 2.5 or less, an inhomogeneity is less likely to arise in distribution of each of the phases within the particle.

As described above, the active material according to the embodiment includes the $Nb_2TiO_7$-type crystal phase A and the $Nb_{10}Ti_2O_{29}$-type crystal phase B, where the abundance ratios of the Nb element and Ti element within the crystal particle satisfy a relationship of $2.3 \leq A_{Nb}/A_{Ti} \leq 4.0$, and the active material satisfies a relationship of a peak intensity ratio of $0.1 \leq I_\beta/I_\alpha \leq 2.0$ according to X-ray diffraction, and thus, the active material can realize a secondary battery which has balanced input/output performance and can exhibit excellent cycle life performance while maintaining a high energy density. When the mass ratio $M_A/M_B$ of the crystal phase A to the crystal phase B is $0.5 \leq M_A/M_B \leq 2.5$, a uniform crystal phase is more stably obtained.

The active material according to the embodiment may contain one or more additive elements selected from the group consisting of Ta, K, and P. The total amount of the additive elements contained in the active material is preferably 5000 ppm or less in terms of molar ratio with respect to the niobium-titanium composite oxide. The addition amount is more preferably in a range of 200 ppm or more and 3000 ppm or less.

When the active material contains Ta, the crystal stability can be enhanced. When the active material contains at least one selected from the group consisting of K and P, its melting point can be lowered to enhance its crystallinity.

Next, the form, particle size, and specific surface area of the active material according to the embodiment will be described.

<Form>

The form of the active material (niobium-titanium composite oxide) according to the embodiment is not particularly limited. The niobium-titanium composite oxide may take the form of primary particles, for example, or may take the form of secondary particles formed by agglomeration of primary particles. The particles of the niobium-titanium composite oxide may be a mixture of the primary particles and the secondary particles.

The particle of the niobium-titanium composite oxide may have a carbon-containing layer on its surface. The carbon-containing layer may be attached to the surface of the primary particle or may be attached to the surface of the secondary particle. Alternatively, the particle of the niobium-titanium composite oxide may include a secondary particle formed by agglomeration of primary particles having a carbon-containing layer attached on their surfaces. Such a secondary particle can exhibit excellent electrical conductivity since carbon is present among the primary particles. The above-described mode including such a secondary particle is preferable since the active material-containing layer can exhibit a lower electric resistance.

The active material may be a material including a particle or powder of the niobium-titanium composite oxide described above. The niobium-titanium composite oxide preferably accounts for 50% by mass or more and 100% by mass or less of the active material.

<Particle Size>

The average particle size of the active material particles, which are the primary particles or the secondary particles of the niobium-titanium composite oxide, is not particularly limited. The average particle size of the active material particles is, for example, in the range of 0.1 μm or greater and 50 μm or less. The average particle size can be varied depending on the required battery performance. For example, the average particle size is preferably 1.0 μm or less in order to enhance rapid charge-discharge performance. As such, a diffusion distance of lithium ions in the crystal can be reduced, so that the rapid charge-discharge performance can be enhanced. The average particle size can be determined by laser diffraction, for example.

<BET Specific Surface Area>

The BET (Brunauer, Emmett, Teller) specific surface area of the active material according to the embodiment is not particularly limited. However, the BET specific surface area is preferably 2.5 $m^2/g$ or greater and less than 200 $m^2/g$.

When the specific surface area is 2.5 $m^2/g$ or greater, contact area with the electrolyte can be ensured, whereby excellent discharge rate performance can be easily obtained, and charging time can be shortened. On the other hand, when the specific surface area is less than 200 $m^2/g$, the reactivity with the electrolyte does not become too high, and therefore life performance can be improved. In addition, coating properties of a slurry including the active material, which is used in the production of an electrode described below, can be made favorable.

Here, for the measurement of the specific surface area, a method is used by which molecules, for which an occupied area in adsorption is known, are adsorbed onto the surface of powder particles at a temperature of liquid nitrogen, and the specific surface area of the sample is determined from the amount of adsorbed molecules. The most commonly used is the BET method based on low-temperature and low-humidity physical adsorption of an inert gas. The BET method is based on the BET theory, which is the most famous theory as a method of calculating the specific surface area where the Langmuir theory, which is a monomolecular layer adsorption theory, has been extended to multi-molecular layer adsorption. The specific surface area determined by the above method is referred to as a "BET specific surface area".

<Manufacturing Method>

The active material according to the present embodiment can be manufactured by the following method.

$Nb_2O_5$ particles and $TiO_2$ particles are prepared as starting materials. In the case of adding the above-described additive elements Ta, K, and/or P, the oxides of these additive elements, for example, $Ta_2O_5$ particles, $K_2CO_3$ particles, and/or $H_3PO_4$ particles are further prepared.

The oxide particles as starting materials are mixed. At this time, the starting materials are mixed such that the molar ratio in the mixed starting materials becomes richer in Nb than $Nb_2O:TiO_2=1:1$. Specifically, the molar ratio of $Nb_2O_5$ to $TiO_2$ in the starting material is preferably in the range where $Nb_2O_5:TiO_2$ is 1.15:1 or more and 2.0:1 or less. This is because, when the molar ratio in the starting material is within this range, each crystal phase is stably formed since the abundance ratio of the Nb element and the Ti element represented by the ratio $A_{Nb}/A_{Ti}$ of the Nb abundance $A_{Nb}$ to the Ti abundance $A_{Ti}$ in the crystal particle satisfies $2.3 \leq A_{Nb}/A_{Ti} \leq 4.0$ in the resultant active material.

Synthesis is performed by a solid-phase method using the mixed starting materials. In the synthesis by a solid-phase method, first, the mixture of raw materials is mixed with a ball mill for 1 hour or more and 10 hours or less. Subsequently, pre-firing (first firing) is performed before main firing. The pre-firing is desirably performed at a temperature of 600° C. or higher and 1100° C. or lower for 1 hour or more and 12 hours or less. By performing the pre-firing, it is possible to remove a trace amount of impurity components (e.g., water, organic substances, and the like) adsorbed to the raw material powder. The pre-firing may be omitted.

The main firing (second firing) is preferably performed at a temperature of 900° C. or higher and 1200° C. or lower for 1 hour or more and 10 hours or less. The firing is more preferably performed at a temperature of 950° C. or higher and 1050° C. or lower for 2.5 hours or more and 3.5 hours or less. The firing temperature is adjusted to a range of 900° C. or higher and 1200° C. or lower to suppress the reaction between Nb and Ti, thereby separately producing crystal phases which will become nuclei of the $Nb_2TiO_7$-type phase and the $Nb_{10}Ti_2O_{29}$-type phase. This firing can enhance the crystallinity in each crystal phase, but at this stage, there is a boundary point such as an interpenetration point between the $Nb_{10}Ti_2O_{29}$-type phase and the $Nb_2TiO_7$-type phase in the same particle, that is, there is an inhomogeneity in the crystal phase, for example, as in the case of the Patent Document Jpn. Pat. Appln. KOKAI Publication No. 2019-169343.

After the main firing, a high temperature heat treatment is performed. In the high temperature heat treatment (third firing), the heat treatment is preferably performed at a temperature of 1425° C. or higher and 1500° C. or lower for 0.5 hours or more and 2 hours or less. The heat treatment is more preferably performed at a temperature of 1450° C. or higher and 1475° C. or lower for 0.5 hours or more and 1 hour or less. The heat treatment is followed by a quenching. By virtue of having the heat treatment temperature adjusted to be in the range of 1425° C. or higher and 1500° C. or lower, the $Nb_{10}Ti_2O_{29}$-type phase having a lower melting point liquefies earlier in the active material particle and enters into the gap between the $Nb_2TiO_7$-type phases, whereby the inhomogeneity in the crystal phase is eliminated. Similarly, dispersion of the $Nb_2TiO_7$-type phase within the particle is also promoted by thermal vibration, eliminating clear boundary points such as an interpenetration point, and thus each crystal phase is uniformly dispersed in the particle. As a result, the resultant active material contains the $Nb_2TiO_7$-type crystal phase A and the $Nb_{10}Ti_2O_2$-type crystal phase B, and satisfies the abundance ratio of the Nb element and Ti element represented by the above-described Formula (1): $2.3 \leq A_{Nb}/A_{Ti} \leq 4.0$, and the X-ray powder spectrum thereof satisfies the peak intensity ratio represented by the above-described Formula (2): $0.1 < I_\beta/I_\alpha \leq 2.0$.

Furthermore, in the crystal particle included in the obtained active material, the mass ratio of the $Nb_2TiO_7$-type crystal phase A to the $Nb_{10}Ti_2O_{29}$-type crystal phase B may satisfy the above-described Formula (3): $0.5 \leq M_A/M_B \leq 2.5$.

When the main firing is performed at a temperature lower than 900° C., the reaction between Nb and Ti hardly progresses, and the raw material oxides remain. When the main firing is performed at a temperature exceeding 1200° C., the diffusions of the Nb element and the Ti element progress fast, and thus a mixed phase of the $Nb_2TiO_7$-type phase and the $Nb_{10}Ti_2O_{29}$-type phase is not formed in the primary particle, and an unintended impurity phase tends to be produced.

When the high temperature heat treatment is performed at a temperature lower than 1425° C., the molten state of the $Nb_{10}Ti_2O_{29}$-type phase and the migration thereof by thermal vibration are not sufficient, and thus a crystal phase having a uniform distribution within the particle cannot be obtained. When the high-temperature heat treatment is performed at a temperature higher than 1500° C., both the $Nb_2TiO_7$-type phase and the $Nb_{10}Ti_2O_{29}$-type phase are simultaneously liquefied. As a result, the diffusions of the Nb element and the Ti element are remarkably progressed, and thus a mixed phase of the A-type niobium-titanium composite oxide phase ($Nb_2TiO_7$-type crystal phase) and the B-type niobium-titanium composite oxide phase ($Nb_{10}Ti_2O_{29}$-type crystal phase) is not formed in the primary particle, and an unintended impurity phase tends to be produced.

<Measurement Method>

Hereinafter, a method of measuring the active material will be described. Specifically, powder X-ray diffraction measurement and an observation by transmission electron microscope-energy dispersive X-ray spectroscopy will be described.

When an active material to be measured is contained in a battery, a measurement sample is taken out from the battery by the method described below, for example.

First, in order to grasp the crystal state of the active material, lithium ions are completely extracted from the active material. For example, when the active material is used in a negative electrode, the battery is brought into a completely discharged state. For example, the battery can be brought into the discharged state by discharging the battery at a current of 0.1 C in an environment at 25° C. until a rated end voltage or a battery voltage of 1.0 V is reached, and repeating this discharge process multiple times so as to make the current value during discharge become 1/100 or less of the rated capacity. There may be a case where remaining lithium ions still exist even in the discharged state.

Next, the battery is disassembled in a glove box filled with argon, and the electrode is taken out. The removed electrode is then washed with an appropriate solvent. As the solvent for washing, for example, ethyl methyl carbonate or the like may be used. When washing of the electrode is insufficient, an impurity phase such as lithium carbonate or lithium fluoride may be mixed into the measurement sample due to the influence of lithium ions remaining in the electrode. In that case, it is preferable to use an airtight container with which the measurement can be performed in an inert gas atmosphere.

<Powder X-Ray Diffraction Measurement>

Powder X-ray diffraction (XRD) measurement for the active material can be performed, for example, as follows.

First, a target sample is pulverized until its average particle size reaches about 5 μm. The average particle size can be determined by laser diffraction method. The pulverized sample is filled into a holder portion having a depth of 0.2 mm formed on a glass sample plate. At this time, care should be taken that the holder portion is sufficiently filled with the sample. Furthermore, precaution should be taken so as to not have cracks, voids, and the like due to insufficient filling of the sample. Next, the sample is sufficiently pressed from the outside using another glass plate so that the surface of the sample is flattened. At this time, care should be taken so as to not have depressions or protrusions with respect to the reference plane of the holder due to an excessive or insufficient filling amount. Next, the glass plate filled with the sample is placed in a powder X-ray diffractometer, and an X-ray diffraction (XRD) pattern is acquired using Cu-Kα rays.

Note that, in this measurement, the dispersion state of the crystal phase within the particle is examined taking advantage of the fact that the particle orientation increases depending on the particle shape of the sample. For this reason, neither a measurement with a rotary sample stage using a glass capillary or the like, which is known to alleviate the influence of the orientation, nor various corrections for the crystal orientation are performed. When such a measurement is performed, the information on the crystal orientation is excluded, and thus the peak intensity ratio according to the above-described Formula (2) cannot be determined.

In the case of measuring the active material included in the electrode taken out from the battery, the washed electrode is cut so as to have an area approximately equal to the area of the holder of the powder X-ray diffractometer to obtain a measurement sample. This sample is directly attached to the glass holder to perform the measurement.

At this time, the positions of peaks derived from an electrode substrate such as a metal foil are measured in advance. In addition, the peaks of other components such as an electro-conductive agent or a binder are also measured in advance. When the peak of the substrate and the peak of the active material overlap with each other, it is desirable that a layer containing the active material (e.g., an active material-containing layer to be described later) is dislodged from the substrate and then subjected to the measurement. The aim of this is to separate the overlapping peaks in quantitative measurement of the peak intensity. Although the active material-containing layer may be physically dislodged, the layer is easily dislodged when sonicated in a solvent. When a sonication treatment is performed, an electrode material powder (containing the active material, the electro-conductive agent, and the binder) can be collected by vaporizing the solvent off. The powder X-ray diffraction measurement of the active material can be performed by filling the collected electrode material powder into a Lindemann glass capillary or the like, for example, and performing the measurement. Note that, the electrode material powder collected by performing sonication can also be subjected to various analyses other than the powder X-ray diffraction measurement.

As an apparatus for powder X-ray diffraction measurement, SmartLab manufactured by Rigaku is used, for example. Measurement is performed under the following conditions:

X-ray source: Cu target
Output: 45 kV, 200 mA
soller slit: 5 degrees in both incident light and received light
step width (2θ): 0.01 deg
scan speed: 2 deg/min
semiconductor detector: D/teX Ultra 250
sample plate holder: flat glass sample plate holder (0.5 mm thick)
measurement range: 5°≤2θ≤90°

When another apparatus is used, measurement using a standard Si powder for powder X-ray diffraction is performed, so as to find conditions that provide measurement results of peak intensity, half width, and diffraction angle that are equivalent to the results obtained by the above apparatus, and measurement of the sample is performed with those conditions.

Conditions of the XRD measurement is set to a condition with which an XRD pattern applicable to Rietveld analysis is obtained. In order to collect data for Rietveld analysis, specifically, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The mass mixing ratio $M_A/M_B$ of the two crystal phases can be determined by performing Rietveld analysis using the obtained diffraction pattern.

Furthermore, among the obtained diffraction peaks, a peak having the maximum peak intensity within the range where 2θ is 8.5°≤2θ≤9.0° is defined as a peak α, and the peak intensity $I_\alpha$ thereof is determined. In addition, among the diffraction peaks, a peak having the maximum peak intensity within the range where 2θ is 12.50°≤2θ≤13.0° is defined as a peak β, and the peak intensity Is thereof is determined. The peak intensity ratio $I_\beta/I_\alpha$ is then calculated therefrom.

<Observation by Transmission Electron Microscope-Energy Dispersive X-Ray Spectroscopy>

According to an observation by transmission electron microscope-energy dispersive X-ray spectroscopy (TEM-EDS), the distribution of crystal phases within each particle in a material having a mixed-phase can be examined.

Upon the transmission electron microscope observation, it is desirable to have a target sample powder be embedded in a resin or the like and have the interior of the specimen be uncovered by mechanical polishing, ion milling, or the like. Furthermore, similar processing can be performed even when the target sample is an electrode body. For example, the electrode may be embedded in resin as is, then a portion of interest can be observed, or a current collector (metal foil) may be dislodged from the electrode, so that the electrode can be observed as an electrode powder in which an electro-conductive agent and a binder are mixed. In this manner, it is possible to know how the two crystal phases are distributed within the particle.

A specific example will be described below with reference to FIG. 3. FIG. 3 is a plan view schematically illustrating a particle to be measured. First, the center of gravity of a particle to be measured is regarded as the center of the particle. Next, five measurement points are set at equal intervals on a straight line connecting the center of the particle and an arbitrary point on the particle surface. Multiwave interference images of particle parts at three points in a region orthogonal to each measurement point are examined and an electron beam diffraction pattern is observed. With this observation, it is possible to know a crystal structure included in the corresponding measurement point. For example, when an electron beam diffraction pattern is simulated in advance, the respective distributions of the $Nb_2TiO_7$-type phase, the $Nb_{10}Ti_2O_{29}$-type phase as well as other phases can be easily grasped. Furthermore, any additive element contained in the crystal can be detected by EDS analysis. When the detected element is mapped on a TEM image, its distribution state can also be examined. For example, when the $Nb_2TiO_7$-type phase and the $Nb_{10}Ti_2O_{29}$-type phase can each be distinguished as being arranged in different regions in the particle, or when any inhomogeneity can be found in the distribution of at least one of crystal phases, it is determined that a uniform distribution is not obtained. In contrast, when a uniform distribution of the $Nb_2TiO_7$-type phase is observed in the particle and at the same time a uniform distribution of the $Nb_{10}Ti_2O_{29}$-type phase is observed as well, and neither a boundary such as an interpenetration point nor uneven distribution of any phase is confirmed, it can be determined that both the A-type niobium-titanium composite oxide phase and the B-type niobium-titanium composite oxide phase are uniformly distributed within the crystal particle.

The active material according to the first embodiment includes a crystal particle that includes a niobium-titanium composite oxide. The ratio $A_{Nb}/A_{Ti}$ of the Nb abundance ratio $A_{Nb}$ to the Ti abundance ratio $A_{Ti}$ in the crystal particle satisfies $2.3 \leq A_{Nb}/A_{Ti} \leq 4.0$, and the intensity ratio $I_\beta/I_\alpha$ of the peak intensity $I_\alpha$ of the peak α that appears at $8.5° \leq 2\theta \leq 9.0$ to the peak intensity $I_\beta$ of the peak β that appears at $12.5° \leq 2\theta \leq 13.0°$ in a powder X-ray diffraction spectrum for the crystal particle under Cu-Kα rays is in the range of $0.1 < I_\beta/I_\alpha \leq 2.0$. This active material can realize a secondary battery which exhibits an excellent weight energy density, and has well-balanced input/output performance and high cycle life performance.

Second Embodiment

According to a second embodiment, an electrode is provided. The electrode includes the active material according to the first embodiment.

This electrode may be a battery electrode including the active material according to the first embodiment as an active material for a battery. The electrode as a battery electrode may be, for example, a negative electrode including the active material according to the first embodiment as a negative electrode active material.

The electrode may include a current collector and an active material-containing layer. The active material-containing layer may be formed on both of reverse surfaces or one surface of the current collector. The active material according to the first embodiment may be contained in the active material-containing layer, for example. The active material-containing layer may optionally contain an electro-conductive agent and a binder, in addition to the active material.

The active material-containing layer may solely include a powder or particles of the active material according to the first embodiment or include two species or more of powders or particles of the active material according to the first embodiment. Furthermore, there also may be included a mixture where one species of powder or particles, or two species or more of powders or particles of the active material according to the first embodiment is further mixed with one species or two species or more of powders or particles of another active material. The contained proportion of the active material according to the first embodiment is desirably from 50% by mass or more to 100% by mass or less with respect to the sum of masses of active material according to the first embodiment and other active materials.

For example, in a case where the active material according to the first embodiment is included as the negative electrode active material, examples of other active materials include powders and particles of lithium titanate having a ramsdellite structure (e.g., $Li_{2+z}Ti_3O_7$, $0 \leq z \leq 3$), lithium titanate having a spinel structure (e.g., $Li_{4+z}Ti_5O_{12}$, $0 \leq z \leq 3$), monoclinic titanium dioxide ($TiO_2$), anatase titanium dioxide, rutile titanium dioxide, a hollandite titanium composite oxide, and an orthorhombic titanium-containing composite oxide. In addition, a powder or particles of monoclinic niobium-titanium composite oxide where the crystal phase within the particle is of a single phase may be used as the other active material.

Examples of the orthorhombic titanium-containing composite oxide include a compound represented by $Li_{2+a}M1_{2-b}Ti_{6-c}M2_dO_{14+\sigma}$. Here, M1 is at least one selected from the group consisting of Sr, Ba, Ca, Mg, Na, Cs, Rb and K. M2 is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b \leq 2$, $0 \leq c \leq 6$, $0 \leq d \leq 6$, and $-0.5 \leq \sigma \leq 0.5$. Specific examples of the orthorhombic titanium-containing composite oxide include $Li_{2+a}Na_2Ti_6O_{14}$ ($0 \leq a \leq 6$).

Examples of the above single-phased particles of monoclinic niobium titanium composite oxide include a single-phase particles of a compound represented by $Li_eTi_{1-f}M3_fNb_{2-g}M4_gO_{7+\delta}$. Here, M3 is at least one selected from the group consisting of Zr, Si, and Sn. M4 is at least one selected from the group consisting of V, Ta, and Bi. The respective subscripts in the composition formula are specified as follows: $0 \leq e \leq 5$, $0 \leq f \leq 1$, $0 \leq g \leq 2$, and $-0.3 \leq \delta \leq 0.3$. Specific examples of the monoclinic niobium titanium composite oxide include $Li_eNb_2TiO_7$ ($0 \leq e \leq 5$).

Another example of single-phased particles of monoclinic niobium titanium composite oxide is a compound represented by $Li_eTi_{1-f}M5_{f+g}Nb_{2-g}O_{7-\delta}$. Here, M5 is at least one selected from the group consisting of Mg, Fe, Ni, Co, W, Ta, and Mo. The respective subscripts in the composition formula are specified as follows: $0 \leq e \leq 5$, $0 \leq f \leq 1$, $0 \leq g \leq 2$, and $-0.3 \leq \delta \leq 0.3$.

The electro-conductive agent is added to improve current collection performance and to suppress the contact resistance between the active material and the current collector. Examples of electro-conductive agent include carbonaceous substances such as vapor grown carbon fiber (VGCF), carbon blacks such as acetylene black, graphite, carbon nanotube, and carbon nanofiber. One of these may be used as the electro-conductive agent, or two or more may be used in combination as the electro-conductive agent. Alternatively, instead of using an electro-conductive agent, a carbon-containing layer may be provided on or an electron conducting inorganic material coating may be applied to the surface of the active material particle. In addition, the current collecting performance of the active material-containing layer may be improved by coating carbon or an electrically conductive material onto the active material surface together with using the electro-conductive agent.

The binder is added to fill gaps among the dispersed active material and also to bind the active material with the current collector. Examples of the binder include polytetrafluoroethylene (PTFE), polyvinylidene fluoride (PVdF), fluoro-rubber, styrene-butadiene rubber, polyacrylate compounds, imide compounds, carboxymethyl cellulose (CMC), and salts of CMC. One of these may be used as the binder, or two or more may be used in combination as the binder.

The blending proportion of active material, electro-conductive agent and binder in the active material-containing layer may be appropriately changed according to the use of the electrode. For example, in the case of using the electrode as a negative electrode of a secondary battery, the active material (negative electrode active material), electro-conductive agent and binder in the active material-containing layer are preferably blended in proportions of 68% by mass to 96% by mass, 2% by mass to 30% by mass, and 2% by mass to 30% by mass, respectively. When the amount of electro-conductive agent is 2% by mass or more, the current collecting performance of the active material-containing layer can be improved. When the amount of binder is 2% by mass or more, binding between the active material-containing layer and current collector is sufficient, and excellent cycling performances can be expected. On the other hand, an amount of each of the electro-conductive agent and binder is preferably 30% by mass or less, in view of increasing the capacity.

In the case where the active material surface is coated with carbon or an electrically conductive material, the coating material amount is considered to be included in the electro-conductive agent amount. The amount of coating by the carbon or electrically conductive material is preferably 0.5% by mass to 5% by mass. With a coating amount within this range, current collecting performance and electrode density can be made high.

There may be used for the current collector, a material which is electrochemically stable at the potential (vs. Li/Li$^+$) at which lithium (Li) is inserted into and extracted from the active material. For example in the case where the active material is used as a negative electrode active material, the current collector is preferably made of copper, nickel, stainless steel, aluminum, or an aluminum alloy including one or more selected from the group consisting of Mg, Ti, Zn, Mn, Fe, Cu, and Si. The thickness of the current collector is preferably from 5 μm to 20 μm. The current collector having such a thickness can maintain balance between the strength and weight reduction of the electrode.

The current collector may include a portion where the active material-containing layer is not formed on a surface thereof. This portion may serve as a current collecting tab.

The electrode may be fabricated by the following method, for example. First, active material, electro-conductive agent, and binder are suspended in a solvent to prepare a slurry. The slurry is applied onto one surface or both of reverse surfaces of a current collector. Next, the applied slurry is dried to form a stack of active material-containing layer and current collector. Then, the stack is subjected to pressing. The electrode can be prepared in this manner.

Alternatively, the electrode may also be fabricated by the following method. First, active material, electro-conductive agent, and binder are mixed to obtain a mixture. Next, the mixture is formed into pellets. Then the electrode can be obtained by arranging the pellets on the current collector.

The electrode according to the second embodiment includes the active material according to the first embodiment. Thus, the electrode according to the second embodiment can realize a secondary battery high in energy density, well-balanced between input performance and output performance, and exhibiting excellent cycle life performance.

Third Embodiment

According to a third embodiment, there is provided a secondary battery including a negative electrode, a positive electrode, and an electrolyte. The negative electrode of the secondary battery includes the electrode according to the second embodiment. That is, the negative electrode of the secondary battery according to the third embodiment includes an electrode including the active material according to the first embodiment as a battery active material.

The secondary battery according to the third embodiment may further include a separator disposed between the positive electrode and the negative electrode. The negative electrode, positive electrode, and separator may configure an electrode group. The electrolyte may be held in the electrode group.

The secondary battery according to the third embodiment may further include a container member that houses the electrode group and the electrolyte.

The secondary battery according to the third embodiment may further include a negative electrode terminal electrically connected to the negative electrode and a positive electrode terminal electrically connected to the positive electrode.

The secondary battery according to the third embodiment may be, for example, a lithium ion secondary battery. The secondary battery also includes nonaqueous electrolyte secondary batteries containing nonaqueous electrolyte(s).

Hereinafter, the negative electrode, positive electrode, electrolyte, separator, container member, negative electrode terminal, and positive electrode terminal will be described in detail.

1) Negative Electrode

The negative electrode may include a negative electrode current collector and a negative electrode active material-containing layer. The negative electrode current collector and the negative electrode active material-containing layer may respectively be the current collector and active material-containing layer that may be included in the electrode according to the second embodiment. The negative electrode active material-containing layer contains the active material according to the first embodiment as negative electrode active material.

Of the details of the negative electrode, sections overlapping with details described in the second embodiment are omitted.

The density of the negative electrode active material-containing layer (excluding the current collector) is preferably from 1.8 g/cm$^3$ to 3.5 g/cm$^3$. The negative electrode having the density of the negative electrode active material-containing layer within this range is excellent in energy density and ability of holding the electrolyte. The density of the negative electrode active material-containing layer is more preferably from 2.5 g/cm$^3$ to 2.9 g/cm$^3$.

The negative electrode may, for example, be fabricated by the same method as for the electrode according to the second embodiment.

2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one species of compound as the positive electrode active material, or alternatively, include two species or more of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium phosphates having an olivine structure (e.g., $Li_xFePO_4$; $0<x\le1$, $Li_xFe_{1-y}Mn_yPO_4$; $0<x\le1$, $0<y\le1$, and $Li_xCoPO_4$; $0<x\le1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\le1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\le1$), lithium nickel composite oxides (e.g., $Li_xNiO_2$; $0<x\le1$), lithium cobalt composite oxides (e.g., $Li_xCoO_2$; $0<x\le1$), lithium nickel cobalt composite oxides (e.g., $Li_xNi_{1-y}Co_yO_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium manganese cobalt composite oxides (e.g., $Li_xMn_yCo_{1-y}O_2$; $0<x\le1$, $0<y<1$), lithium iron phosphates (e.g., $Li_xFePO_4$; $0<x\le1$), and lithium nickel cobalt manganese composite oxides ($Li_xNi_{1-y-z}Co_yMn_zO_2$; $0<x\le1$, $0<y<1$, $0<z<1$, $y+z<1$). The positive electrode potential can be made high by using these positive electrode active materials.

When an ambient temperature molten salt is used as the electrolyte of the battery, it is preferable to use a positive electrode active material including lithium iron phosphate, $Li_xVPO_4F$ ($0<x\le1$), lithium manganese composite oxide, lithium nickel composite oxide, lithium nickel cobalt composite oxide, or a mixture thereof. Since these compounds have low reactivity with ambient temperature molten salts, cycle life can be improved. Details regarding the ambient temperature molten salt are described later.

The primary particle diameter of the positive electrode active material is preferably from 100 nm to 1 μm. The positive electrode active material having a primary particle size of 100 nm or more is easy to handle during industrial production. In the positive electrode active material having a primary particle size of 1 μm or less, in-solid diffusion of lithium ions can proceed smoothly.

The specific surface area of the positive electrode active material is preferably from 0.1 m²/g to 10 m²/g. The positive electrode active material having a specific surface area of 0.1 m²/g or more can secure sufficient sites for inserting and extracting Li ions. The positive electrode active material having a specific surface area of 10 m²/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluororubber, polyacrylate compounds, imide compounds, carboxymethyl cellulose (CMC), and salts of CMC. One of these may be used as the binder, or two or more may be used in combination as the binder.

The electro-conductive agent is added to improve current collecting performance and to suppress the contact resistance between the positive electrode active material and the positive electrode current collector. Examples of electro-conductive agent include carbonaceous substances such as vapor grown carbon fiber (VGCF), carbon black such as acetylene black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, decomposition of electrolyte can be reduced during storage under high temperatures.

The positive electrode current collector is preferably an aluminum foil, or an aluminum alloy foil containing one or more selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface thereof. This portion may serve as a positive electrode current collecting tab.

The positive electrode may be fabricated, for example, by a method similar to that for the electrode according to the second embodiment, using a positive electrode active material.

3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bistrifluoromethylsulfonylimide [$LiN(CF_3SO_2)_2$], lithium bis(fluorosulfonyl)imide ($LiN(SO_2F)_2$; LiFSI), and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); linear ethers such as dimethoxy ethane (DME) and diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, an ambient temperature molten salt (ionic melt) including lithium ions, a polymer solid electrolyte, an inorganic solid electrolyte, or the like may be used as the nonaqueous electrolyte.

The ambient temperature molten salt (ionic melt) indicates compounds among organic salts made of combinations of organic cations and anions, which are able to exist in a liquid state at ambient temperature (15° C. to 25° C.). The ambient temperature molten salt includes an ambient temperature molten salt which exists alone as a liquid, an ambient temperature molten salt which becomes a liquid upon mixing with an electrolyte salt, an ambient temperature molten salt which becomes a liquid when dissolved in an organic solvent, and mixtures thereof. In general, the melting point of the ambient temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

Alternatively, in place of the nonaqueous electrolyte, a liquid aqueous electrolyte or gel aqueous electrolyte may be used as the electrolyte. The liquid aqueous electrolyte is prepared by dissolving, for example, the electrolyte salt shown below, as solute in an aqueous solvent. The gel aqueous electrolyte is prepared by obtaining a composite of the liquid aqueous electrolyte and the above-mentioned polymeric material. As the aqueous solvent, a solution including water may be used. Here, the solution including water may be pure water or a solvent mixture of water and an organic solvent.

Examples of electrolyte salts that can be used in the aqueous electrolyte include a lithium salt, a sodium salt, or a mixture thereof.

As the lithium salt, for example, lithium chloride (LiCl), lithium bromide (LiBr), lithium hydroxide (LiOH), lithium sulfate ($Li_2SO_4$), lithium nitrate ($LiNO_3$), lithium acetate ($CH_3COOLi$), lithium oxalate ($Li_2C_2O_4$), lithium carbonate ($Li_2CO_3$), lithium bis(trifluoromethanesulfonyl)imide (LiTFSI; $LiN(SO_2CF_3)_2$), lithium bis(fluorosulfonyl)imide (LiFSI; $LiN(SO_2F)_2$), lithium bis(oxalate)borate (LiBOB: $LiB[(OCO)_2]_2$), or the like may be used.

As the sodium salt, for example, sodium chloride (NaCl), sodium sulfate ($Na_2SO_4$), sodium hydroxide (NaOH), sodium nitrate ($NaNO_3$), sodium trifluoromethanesulfonyl amide (NaTFSA), or the like may be used.

The mol concentration of lithium ions or sodium ions in the aqueous electrolyte is preferably 3 mol/L or more, more preferably 6 mol/L or more, and much more preferably 12 mol/L or more. When an aqueous electrolyte is used, an electrolysis reaction of the aqueous solvent may occur at the negative electrode, whereby self-discharge or hydrogen generation may take place. By having the concentration of the lithium ions or sodium ions in the aqueous electrolyte be high, electrolysis of the aqueous solvent at the negative electrode can easily be suppressed, and hydrogen generation from the negative electrode tends to be little.

In addition, aside from the lithium salts and sodium salts, zinc salts such as zinc chloride and zinc sulfate may be added to the aqueous electrolyte. By addition of such compounds to the aqueous electrolyte in a battery using the active material according to the first embodiment in the negative electrode, a zinc-containing coating layer and/or an oxidized zinc-containing region may be formed in the negative electrode. Such zinc-containing members exhibit the effect of suppressing hydrogen generation in the negative electrode where the members are formed.

4) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal container is made of, for example, aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), prismatic, cylindrical, coin-shaped, or button-shaped. The container member may be appropriately selected depending on battery size and use of the battery.

6) Negative Electrode Terminal

The negative electrode terminal may be made of a material that is electrochemically stable at the potential (V vs. $Li/Li^+$) at which Li is inserted into and extracted from the above-described negative electrode active material, and has electrical conductivity. Specific examples of the material for the negative electrode terminal include copper, nickel, stainless steel, aluminum, and aluminum alloy containing at least one selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance between the negative electrode terminal and the negative electrode current collector.

7) Positive Electrode Terminal

The positive electrode terminal may be made of, for example, a material that is electrically stable in the potential range of 3 V to 4.5 V (vs. $Li/Li^+$) relative to the oxidation-reduction potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance between the positive electrode terminal and the positive electrode current collector.

Next, the secondary battery according to the third embodiment will be more specifically described with reference to the drawings.

Figure 4:
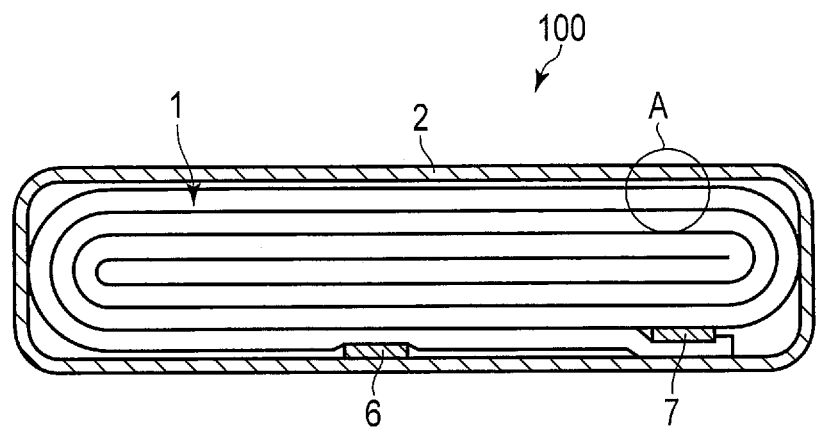
FIG. 4 is a cross-sectional view schematically illustrating an example of a secondary battery according to an embodiment.
Figure 5:
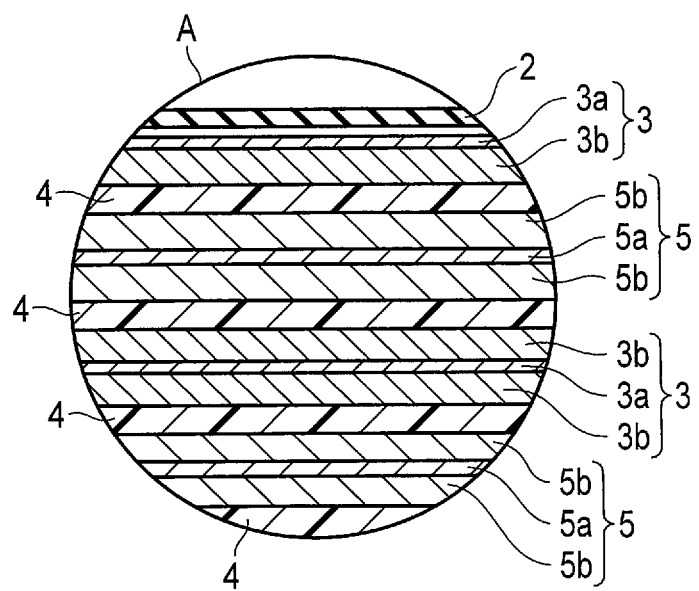
FIG. 5 is an enlarged cross-sectional view of section A of the secondary battery illustrated in FIG. 4.

FIG. 4 is a cross-sectional view schematically showing an example of a secondary battery according to the third embodiment. FIG. 5 is an enlarged cross-sectional view of section A of the secondary battery shown in FIG. 4.

The secondary battery 100 shown in FIGS. 4 and 5 includes an electrode group 1 shown in FIG. 4, a bag-shaped container member 2 shown in FIGS. 4 and 5, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 4, the electrode group 1 is a wound electrode group in a flat form. The wound electrode group 1 in a flat form includes a negative electrode 3, a separator 4, and a positive electrode 5, as shown in FIG. 5. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 5. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 4, a negative electrode terminal 6 and positive electrode terminal 7 are positioned in vicinity of the outer peripheral end of the wound electrode group 1. The negative electrode terminal 6 is connected to a portion of the negative electrode current collector 3a positioned outermost. The positive electrode terminal 7 is connected to a portion of the positive electrode current collector sa positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 6:
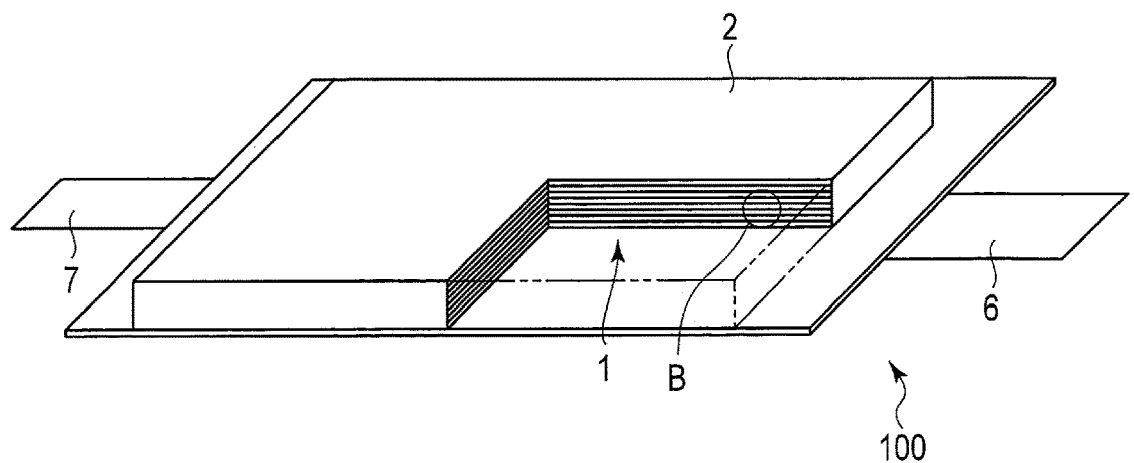
FIG. 6 is a partially cut-out perspective view schematically illustrating another example of the secondary battery according to the embodiment.
Figure 7:
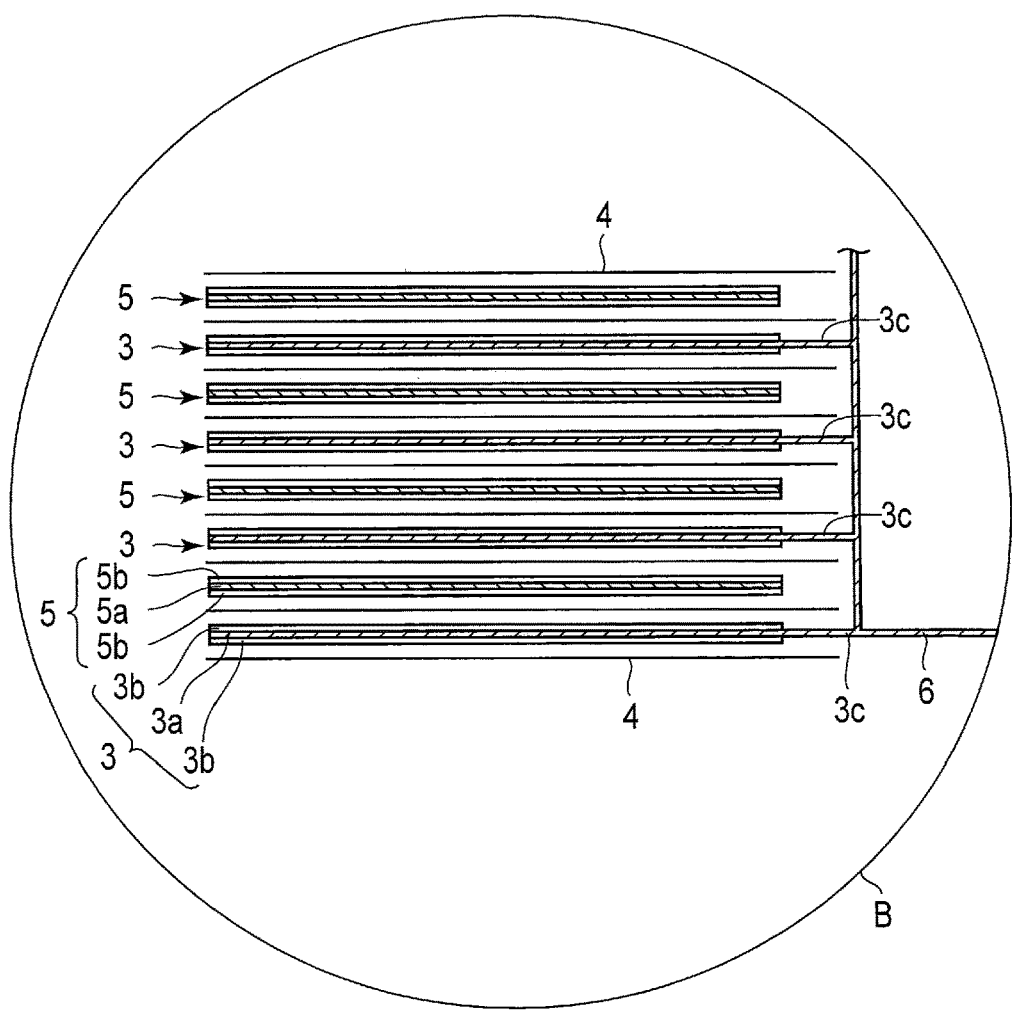
FIG. 7 is an enlarged cross-sectional view of section B of the secondary battery illustrated in FIG. 6.

The secondary battery according to the third embodiment is not limited to the secondary battery of the structure shown in FIGS. 4 and 5, and may be, for example, a battery of a structure as shown in FIGS. 6 and 7.

FIG. 6 is a partially cut-out perspective view schematically showing another example of the secondary battery according to the third embodiment. FIG. 7 is an enlarged cross-sectional view of section B of the secondary battery shown in FIG. 6.

The secondary battery 100 shown in FIGS. 6 and 7 includes an electrode group 1 shown in FIGS. 6 and 7, a container member 2 shown in FIG. 6, and an electrolyte, which is not shown. The electrode group 1 and electrolyte are housed in the container member 2. The electrolyte is held in the electrode group 1.

The container member 2 is made of a laminate film including two resin layers and a metal layer sandwiched between the resin layers.

As shown in FIG. 7, the electrode group 1 is a stacked electrode group. The stacked electrode group 1 has a structure in which negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode current collecting tab. As shown in FIG. 7, the portions 3c serving as the negative electrode current collecting tabs do not overlap the positive electrodes 5. The plural negative electrode current collecting tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode current collecting tab. Like the negative electrode current collecting tabs (portion 3c), the positive electrode current collecting tabs do not overlap the negative electrodes 3. Further, the positive electrode current collecting tabs are located on the opposite side of the electrode group 1 with respect to the negative electrode current collecting tabs (portion 3c). The positive electrode current collecting tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the third embodiment includes the electrode according to the second embodiment. Namely, the secondary battery according to the third embodiment includes the electrode including the active material according to the first embodiment. Thus, the secondary battery according to the third embodiment has high energy density, is well-balanced between input performance and output performance, and exhibits excellent cycle life performance.

Fourth Embodiment

According to a fourth embodiment, a battery module is provided. The battery module according to the fourth embodiment includes plural of secondary batteries according to the third embodiment.

In the battery module according to the fourth embodiment, each of the single-batteries may be arranged to be electrically connected in series or in parallel, or may be arranged in combination of in-series connection and in-parallel connection.

An example of the battery module according to the fourth embodiment will be described next, with reference to the drawings.

Figure 8:
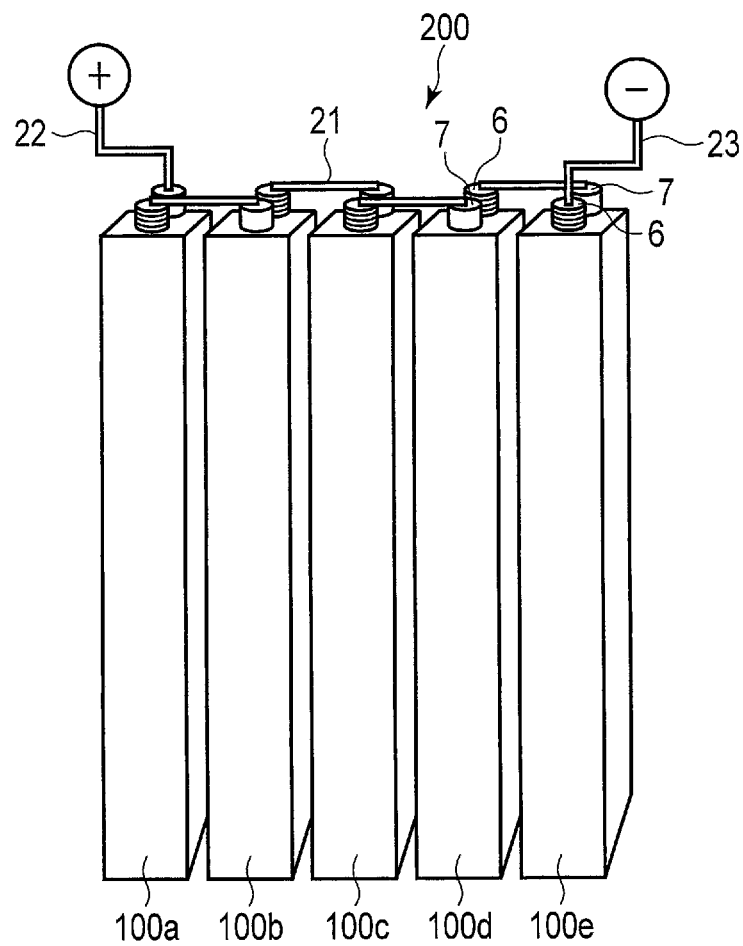
FIG. 8 is a perspective view schematically illustrating an example of a battery module according to an embodiment.

FIG. 8 is a perspective view schematically showing an example of the battery module according to the fourth embodiment. The battery module 200 shown in FIG. 8 includes five single-batteries 100*a* to 100*e*, four bus bars 21, a positive electrode-side lead 22, and a negative electrode-side lead 23. Each of the five single-batteries 100*a* to 100*e* is the secondary battery according to the third embodiment.

The bus bar 21 connects, for example, a negative electrode terminal 6 of one single-battery 100*a* and a positive electrode terminal 7 of the single-battery 100*b* positioned adjacent. In such a manner, five single-batteries 100 are thus connected in series by the four bus bars 21. That is, the battery module 200 shown in FIG. 8 is a battery module of five-in-series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 7 of at least one battery among the five single-batteries 100*a* to 100*e* is electrically connected to the positive electrode-side lead 22 for external connection. In addition, the negative electrode terminal 6 of at least one battery among the five single-batteries 100*a* to 100*e* is electrically connected to the negative electrode-side lead 23 for external connection.

The battery module according to the fourth embodiment includes the secondary battery according to the third embodiment. Therefore, the battery module has high energy density, is well-balanced between input performance and output performance, and exhibits excellent cycle life performance.

Fifth Embodiment

According to a fifth embodiment, a battery pack is provided. The battery pack includes a battery module according to the fourth embodiment. The battery pack may include a single secondary battery according to the third embodiment, in place of the battery module according to the fourth embodiment.

The battery pack according to the fifth embodiment may further include a protective circuit. The protective circuit has a function to control charging and discharging of the secondary battery. Alternatively, a circuit included in equipment where the battery pack serves as a power source (for example, electronic devices, automobiles, and the like) may be used as the protective circuit for the battery pack.

Moreover, the battery pack according to the fifth embodiment may further include an external power distribution terminal. The external power distribution terminal is configured to externally output current from the secondary battery, and/or to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fifth embodiment will be described with reference to the drawings.

Figure 9:
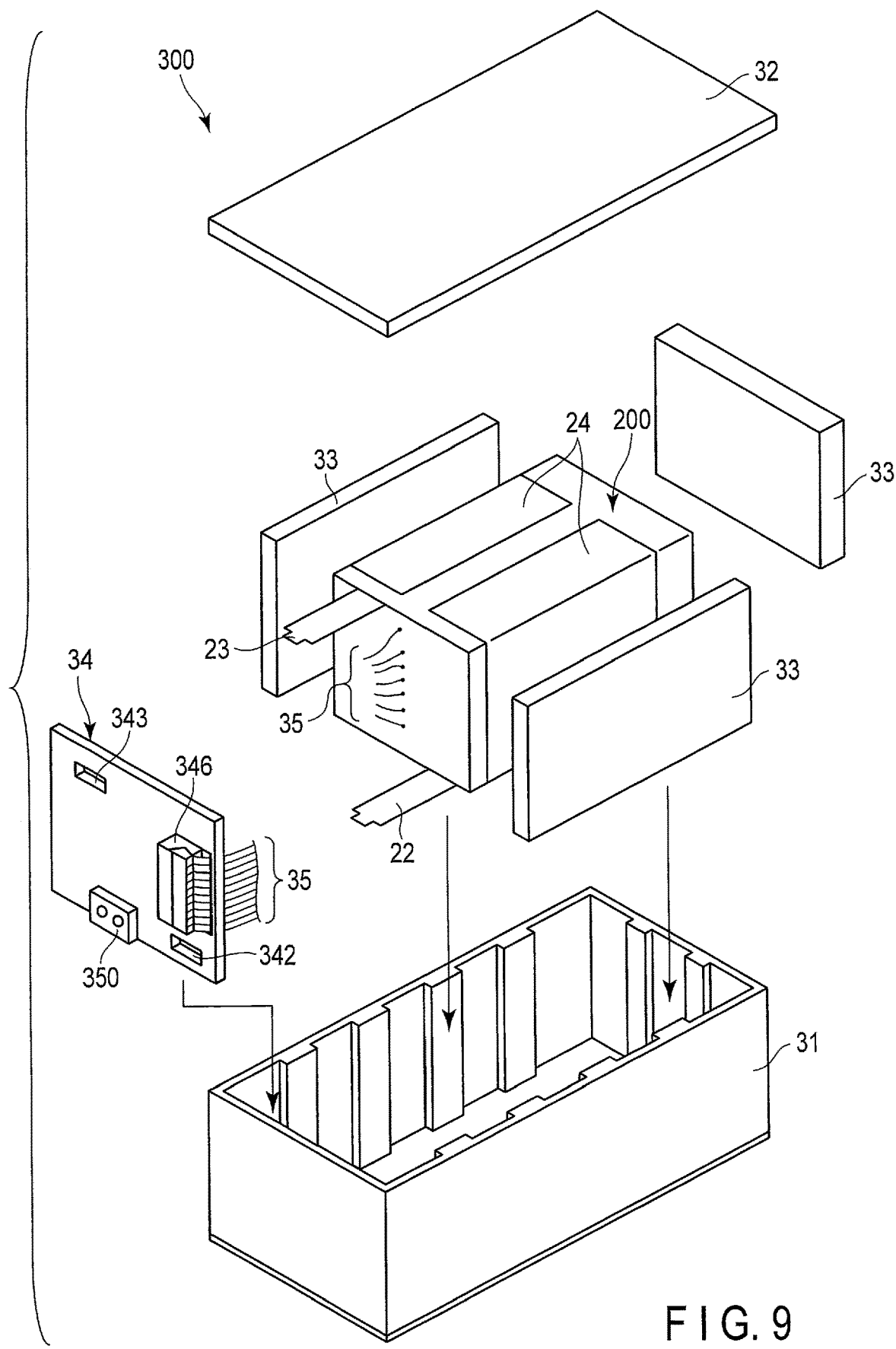
FIG. 9 is an exploded perspective view schematically illustrating an example of a battery pack according to an embodiment.
Figure 10:
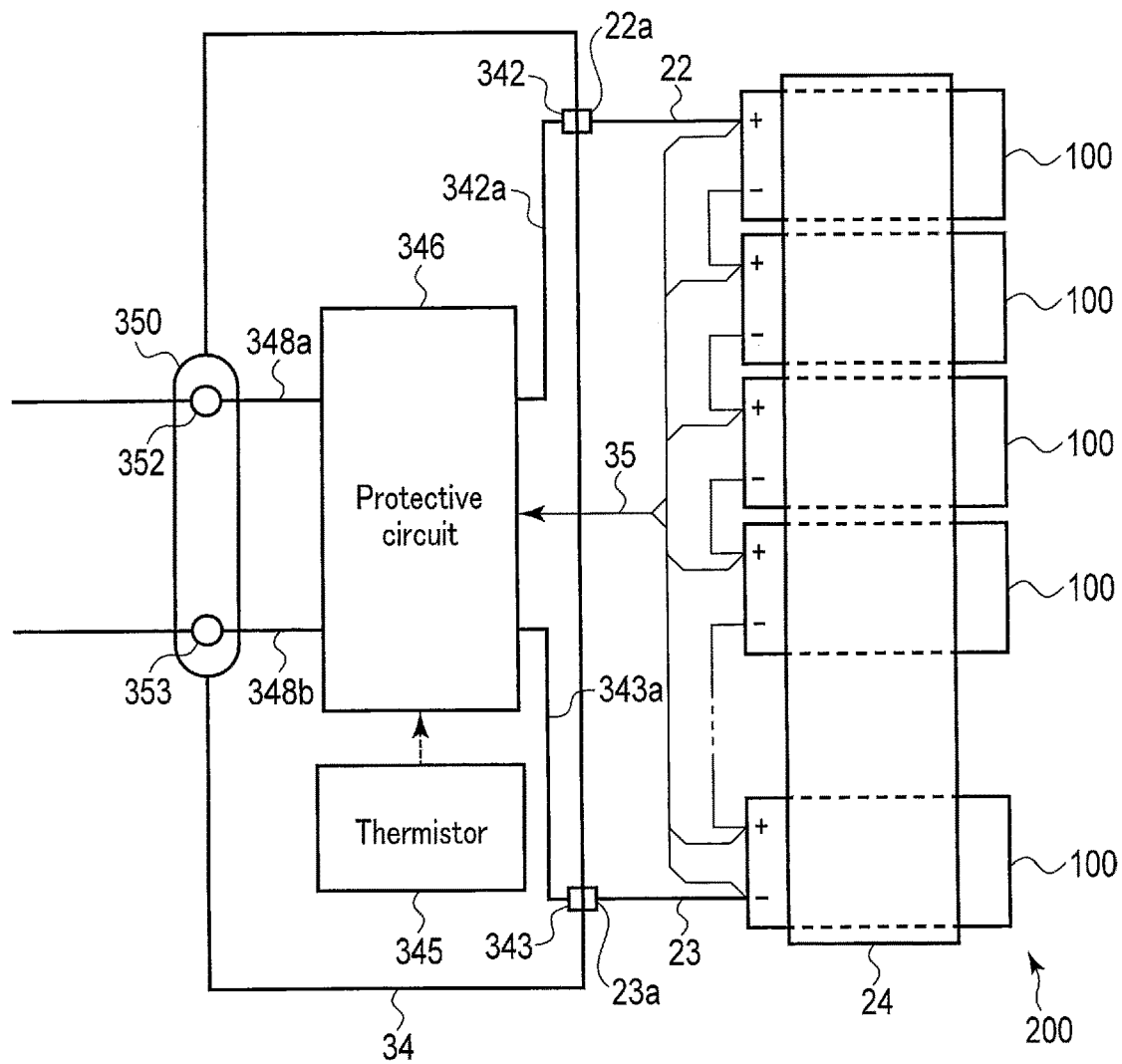
FIG. 10 is a block diagram illustrating an example of an electric circuit of the battery pack illustrated in FIG. 9.

FIG. 9 is an exploded perspective view schematically showing an example of the battery pack according to the fifth embodiment. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wires 35, and an insulating plate (not shown).

The housing container 31 shown in FIG. 9 is a square bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a secondary battery according to the third embodiment. The plural single-batteries 100 are electrically connected in series, as shown in FIG. 10. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode (s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342*a* and 343*a*, an external power distribution terminal 350, a plus-side wiring (positive-side wiring) 348*a*, and a minus-side wiring (negative-side wiring) 348*b*. One principal surface of the printed wiring board 34 faces one side surface of the battery module 200. An insulating plate (not shown) is disposed in between the printed wiring board 34 and the battery module 200.

The other end 22*a* of the positive electrode-side lead 22 is electrically connected to the positive electrode-side connector 342. The other end 23a of the negative electrode-side lead 23 is electrically connected to the negative electrode-side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external device (s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of over-charge, over-discharge, and overcurrent of the single-battery(s) 100. When detecting over charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal 352 and negative-side terminal 353 of the external power distribution terminal 350.

Such a battery pack is used, for example, in applications where excellent cycle performance is demanded when a large current is extracted. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fifth embodiment is provided with the secondary battery according to the third embodiment or the battery module according to the fourth embodiment. Accordingly, the battery pack has high energy density, is well-balanced between input performance and output performance, and exhibits excellent cycle life performance.

Sixth Embodiment

According to a sixth embodiment, a vehicle is provided. The battery pack according to the fifth embodiment is installed on this vehicle.

In the vehicle according to the sixth embodiment, the battery pack is configured, for example, to recover regenerative energy from motive force of the vehicle. The vehicle may include a mechanism (a regenerator) configured to convert kinetic energy of the vehicle into regenerative energy.

Examples of the vehicle according to the sixth embodiment include two-wheeled to four-wheeled hybrid electric automobiles, two-wheeled to four-wheeled electric automobiles, electrically assisted bicycles, and railway cars.

In the vehicle according to the sixth embodiment, the installing position of the battery pack is not particularly limited. For example, when installing the battery pack on an automobile, the battery pack may be installed in the engine compartment of the automobile, in rear parts of the vehicle body, or under seats.

The vehicle according to the sixth embodiment may have plural battery packs installed. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

An example of the vehicle according to the sixth embodiment is explained below, with reference to the drawings.

Figure 11:
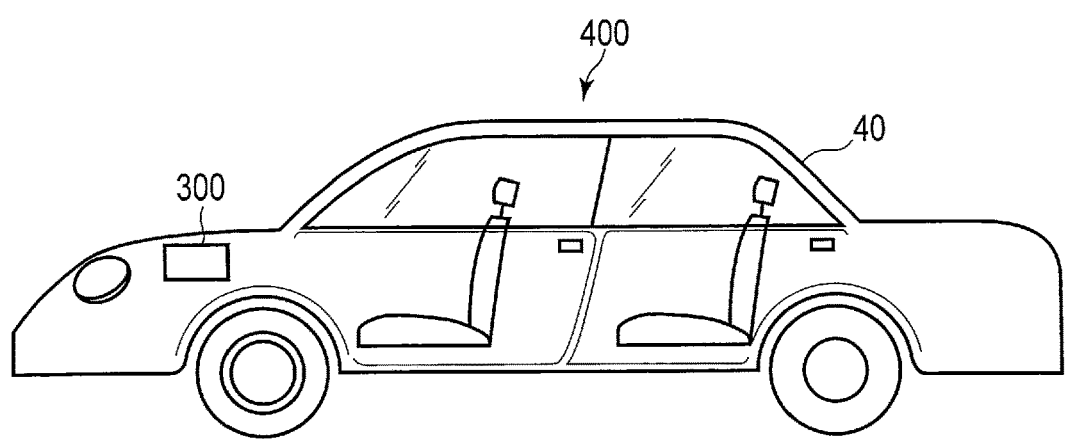
FIG. 11 is a partially see-through diagram schematically showing an example of a vehicle according to an embodiment.

FIG. 11 is a partially see-through diagram schematically showing an example of a vehicle according to the sixth embodiment.

A vehicle 400, shown in FIG. 11 includes a vehicle body 40 and a battery pack 300 according to the fifth embodiment. In the example shown in FIG. 11, the vehicle 400 is a four-wheeled automobile.

This vehicle 400 may have plural battery packs 300 installed. In such a case, the batteries (e.g., single-batteries or battery module) included in the battery packs 300 may be connected in series, connected in parallel, or connected in a combination of in-series connection and in-parallel connection.

In FIG. 11, depicted is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Figure 12:
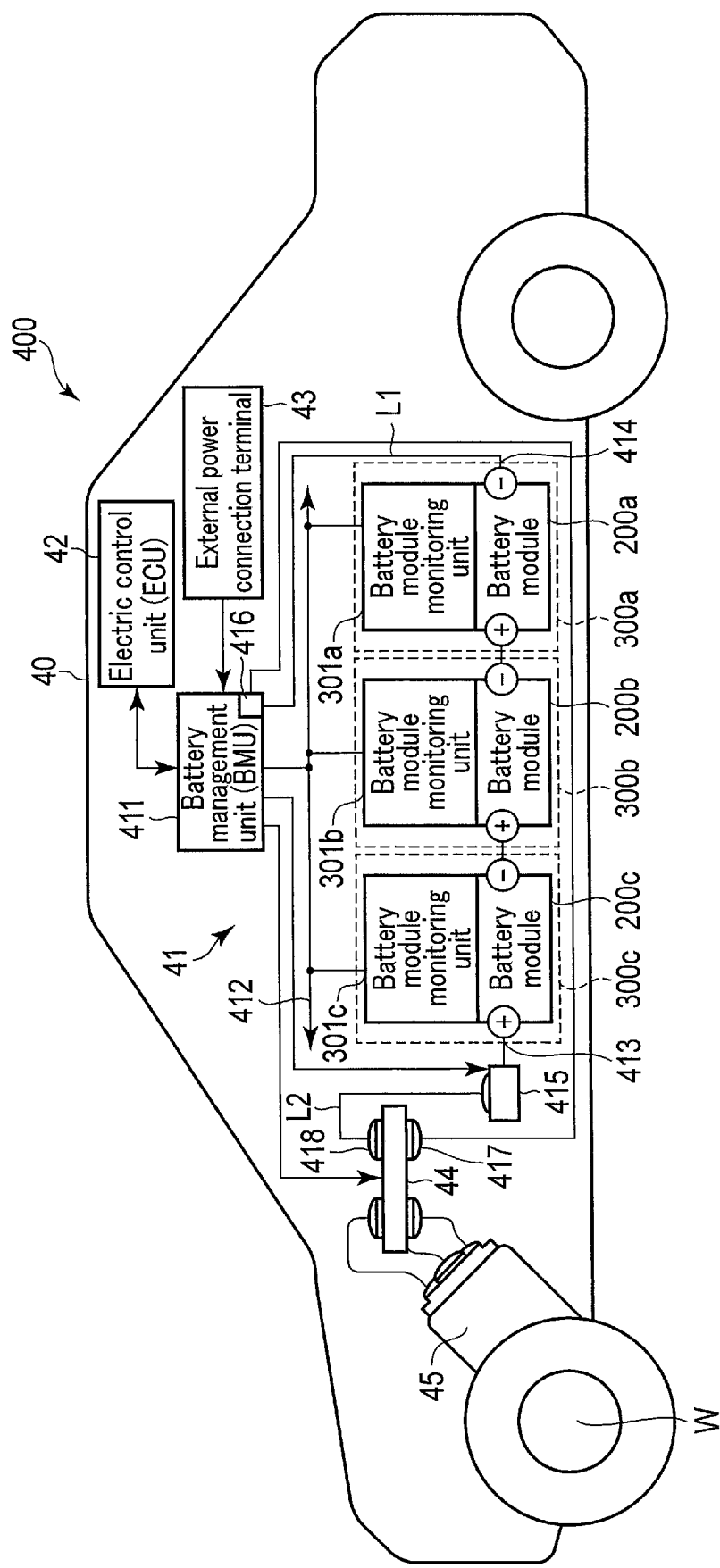
FIG. 12 is a diagram schematically showing an example of a control system related to an electric system in the vehicle according to an embodiment.

Next, with reference to FIG. 12, an aspect of operation of the vehicle according to the sixth embodiment is explained.

FIG. 12 is a diagram schematically showing an example of a control system related to an electric system in the vehicle according to the sixth embodiment. A vehicle 400, shown in FIG. 12, is an electric automobile.

The vehicle 400, shown in FIG. 12, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 12, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit 301a (e.g., a VTM: voltage temperature monitoring). The battery pack 300b includes a battery module 200b and a battery module monitoring unit 301b. The battery pack 300c includes a battery module 200c and a battery module monitoring unit 301c. The battery packs 300a to 300c are battery packs similar to the aforementioned battery pack 300, and the battery modules 200a to 200c are battery modules similar to the aforementioned battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the third embodiment. The battery modules 200a to 200c each perform charging and discharging via a positive electrode terminal 413 and a negative electrode terminal 414.

The battery management unit 411 performs communication with the battery module monitoring units 301a to 301c and collects information such as voltages or temperatures for each of the single-batteries 100 included in the battery modules 200a to 200c included in the vehicle power source 41. In this manner, the battery management unit 411 collects information concerning security of the vehicle power source 41.

The battery management unit 411 and the battery module monitoring units 301a to 301c are connected via the communication bus 412. In the communication bus 412, a set of communication lines is shared at multiple nodes (i.e., the battery management unit 411 and one or more battery module monitoring units 301a to 301c). The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 12) for switching on and off electrical connection between the positive electrode terminal 413 and the negative electrode terminal 414. The switch unit 415 includes a precharge switch (not shown), which is turned on when the battery modules 200a to 200c are charged, and a main switch (not shown), which is turned on when output from the battery modules 200a to 200c is supplied to a load. The precharge switch and the main switch each include a relay circuit (not shown), which is switched on or off based on a signal provided to a coil disposed near the switch elements. The magnetic contactor such as the switch unit 415 is controlled based on control signals from the battery management unit 411 or the vehicle ECU 42, which controls the operation of the entire vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management unit 411 or the vehicle ECU 42, which controls the entire operation of the vehicle. Due to the inverter 44 being controlled, output voltage from the inverter 44 is adjusted.

The drive motor 45 is rotated by electric power supplied from the inverter 44. The drive generated by rotation of the motor 45 is transferred to an axle and driving wheels W via a differential gear unit, for example.

The vehicle 400 also includes a regenerative brake mechanism (a regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connecting line L1 is connected to the negative electrode terminal 414 of the vehicle power source 41. The other terminal of the connecting line L1 is connected to a negative electrode input terminal 417 of the inverter 44. A current detector (current detecting circuit) 416 in the battery management unit 411 is provided on the connecting line L1 in between the negative electrode terminal 414 and negative electrode input terminal 417.

One terminal of a connecting line L2 is connected to the positive electrode terminal 413 of the vehicle power source 41. The other terminal of the connecting line L2 is connected to a positive electrode input terminal 418 of the inverter 44. The switch unit 415 is provided on the connecting line L2 in between the positive electrode terminal 413 and the positive electrode input terminal 418.

The external terminal 43 is connected to the battery management unit 411. The external terminal 43 is able to connect, for example, to an external power source.

The vehicle ECU 42 performs cooperative control of the vehicle power source 41, switch unit 415, inverter 44, and the like, together with other management units and control units including the battery management unit 411 in response to inputs operated by a driver or the like. Through the cooperative control by the vehicle ECU 42 and the like, output of electric power from the vehicle power source 41, charging of the vehicle power source 41, and the like are controlled, thereby performing the management of the whole vehicle 400. Data concerning the security of the vehicle power source 41, such as a remaining capacity of the vehicle power source 41, are transferred between the battery management unit 411 and the vehicle ECU 42 via communication lines.

The vehicle according to the sixth embodiment is installed with the battery pack according to the fifth embodiment. Therefore, a vehicle with high performance and high reliability can be provided.

EXAMPLES

Hereinafter, the above-described embodiments will be described in more detail based on Examples.
<Synthesis Method>

Example 1

A niobium-titanium composite oxide was synthesized by the solid phase synthesis method described below.

First, $Nb_2O_5$ particles and $TiO_2$ particles were prepared. In order to obtain a target crystal phase, respective particles were weighed out so as to have the molar ratio of $Nb_2O_5$ to $TiO_2$ be 1.7:1, and were mixed with a dry ball mill for 1 hour. The obtained powder was placed in an alumina crucible and subjected to pre-firing (first firing) at a temperature of 800° C. for 12 hours. After the pre-firing, the obtained powder was placed in a platinum crucible and subjected to main firing (second firing) at 1050° C. for 3 hours. After the main firing, the powder was pulverized again with a dry ball mill for 3 hours, and then subjected to high temperature heat treatment (third firing) at a temperature of 1475° C. for 1 hour. Subsequently, the mixture was pulverized again with a dry ball mill for 1 hour to obtain the active material of Example 1.

Examples 2 to 5

Active materials of Examples 2 to 5 were obtained by the same synthesis as the method described in Example 1 except that the raw materials were mixed according to the predetermined ratios described in Table 1 regarding the molar ratio of $Nb_2O_5$ particles to $TiO_2$ particles as raw materials.

Example 6

An active material of Example 6 was obtained by the same synthesis as the method described in Example 1 except that the raw materials were mixed according to the predetermined ratio described in Table 1 regarding the molar ratio of $Nb_2O_5$ particles to $TiO_2$ particles as raw materials, and on top of that, the condition of the high temperature heat treatment (third firing) was modified to 1500° C. for 2 hours.

Examples 7 to 8

Active materials of Examples 7 to 8 were obtained by the same synthesis as the method described in Example 1 except that the raw materials were mixed according to the predetermined ratios described in Table 1 regarding the molar ratio of $Nb_2O_5$ particles to $TiO_2$ particles as raw materials.

Example 9

$Nb_2O_5$ particles and $TiO_2$ particles were prepared. In order to obtain a target crystal phase, respective particles were weighed out so as to have the molar ratio of $Nb_2O_5$ to $TiO_2$ be 1.5:1, and were mixed with a dry ball mill for 30 minutes. Subsequently, $Ta_2O_5$ particles were added so as to have the Ta element be 200 ppm (molar ratio) relative to the total amount of the obtained powder, and the mixture was mixed again with a dry ball mill for 30 minutes. The obtained powder was placed in an alumina crucible and subjected to pre-firing (first firing) at a temperature of 800° C. for 12 hours. After the pre-firing, the obtained powder was placed in a platinum crucible and subjected to main firing (second firing) at 1050° C. for 3 hours. After the main firing, the powder was pulverized again with a dry ball mill for 3 hours, and then subjected to high temperature heat treatment (third firing) at a temperature of 1475° C. for 1 hour. Subsequently, the mixture was pulverized again with a dry ball mill for 1 hour to obtain the active material of Example 9.

Examples 10 to 12

Active materials of Examples 10 to 12 were obtained by the same synthesis as the method described in Example 9 except that additive particles ($Ta_2O_5$, $K_2CO_3$, $H_3PO_4$) were mixed with the raw material so as to have the amounts of the Ta element, the K element, and the P element be the predetermined ratios described in Table 1.

Comparative Example 1

A niobium-titanium composite oxide was synthesized by the solid phase synthesis method described below.

First, $Nb_2O_5$ particles and $TiO_2$ particles were prepared so that $Nb_2TiO_7$ would be obtained. In order to obtain a target crystal phase, respective particles were weighed out so as to have the molar ratio of $Nb_2O_5$ to $TiO_2$ be 1:1, and mixed with a dry ball mill. The obtained powder was placed in an alumina crucible and subjected to pre-firing (first firing) at a temperature of 800° C. for 12 hours. After the pre-firing, the obtained powder was placed in a platinum crucible and subjected to main firing (second firing) at 1200° C. for 5 hours. After the main firing, the powder was pulverized and mixed in an agate mortar, and coarse particles were removed by passing the powder through a sieve having a mesh size of 25 μm to obtain the $Nb_2TiO_7$ phase. The obtained niobium-titanium composite oxide contained only primary particles of the single phase of the $Nb_2TiO_7$ phase.

Next, solid phase synthesis method was performed in a similar manner to the above-described synthesis of the $Nb_2TiO_7$ phase except that the molar ratio of $Nb_2O_5$ particles to TiO2 particles was changed to 2.5:1 so that the $Nb_{10}Ti_2O_{29}$ phase would be obtained. The obtained niobium-titanium composite oxide contained only primary particles of the single phase of the $Nb_{10}Ti_2O_{29}$ phase.

The primary particles of the single phase of the Nb$_{10}$Ti$_2$O$_{29}$ phase were mixed at a weight proportion of 0.5% by weight relative to the primary particles of the single phase of the Nb$_2$TiO$_7$ phase to obtain the active material according to Comparative Example 1.

Comparative Example 2

Primary particles of the single phase of the Nb$_2$TiO$_7$ phase and the primary particles of the single phase of the Nb$_{10}$Ti$_2$O$_{29}$ phase were synthesized by the method described in Comparative Example 1. The primary particles of the single phase of the Nb$_{10}$Ti$_2$O$_{29}$ phase were mixed at a weight proportion of 50% by weight relative to primary particles of the single phase of the Nb$_2$TiO$_7$ phase to obtain the active material according to Comparative Example 2.

Comparative Example 3

As starting materials, Nb$_2$O$_5$ particles having an average particle size of 25 μm and TiO$_2$ particles having an average particle size of 1.0 μm were prepared. The respective particles were weighed so as to have the molar ratio of Nb$_2$O$_5$ to TiO$_2$ be 1.5:1, and were mixed with a dry ball mill. The obtained powder was placed in an alumina crucible and subjected to pre-firing (first firing) at a temperature of 800° C. for 12 hours. After the pre-firing, the obtained powder was placed in a platinum crucible and subjected to main firing (second firing) at 1000° C. for 5 hours.

After the main firing, the powder was pulverized and mixed in an agate mortar, and coarse particles were removed bypassing the powder through a sieve having a mesh size of 25 μm, whereby mixed-phase active material particles according to Comparative Example 3 were synthesized.

Comparative Example 4

A niobium-titanium composite oxide was synthesized by the solid phase synthesis method described below.

First, Nb$_2$O$_5$ particles and TiO$_2$ particles were prepared. In order to obtain a target crystal phase, respective particles were weighed so as to have the molar ratio of Nb$_2$O$_5$ to TiO$_2$ be 1.25:1, and mixed with a dry ball mill for 1 hour. The obtained powder was placed in an alumina crucible and subjected to pre-firing (first firing) at a temperature of 800° C. for 12 hours. After the pre-firing, the obtained powder was placed in a platinum crucible and subjected to main firing (second firing) at 1050° C. for 3 hours. After the main firing, the powder was pulverized again with a dry ball mill for 3 hours, and then subjected to a high temperature heat treatment (third firing) at a temperature of 1600° C. for 2 hours, and thereafter, the powder was pulverized again with a dry ball mill for 1 hour to obtain the active material of Comparative Example 4.

Comparative Example 5

An active material of Comparative Example 5 was obtained by the same synthesis as the method described in Example 1 except that the raw material mixing ratio of Nb$_2$O$_5$ particles to TiO$_2$ particles was modified so as to have the molar ratio of Nb$_2$O$_5$ to TiO$_2$ be 2.2:1.

<Powder X-Ray Diffraction Measurement and Calculation of Peak Intensity Ratio $I_\beta/I_\alpha$>

For the active material powders obtained in Examples 1 to 12 and Comparative Examples 1 to 5, the powder X-ray diffraction measurement described in the first embodiment was performed under conditions of a sampling interval of 0.01° and a scanning rate of 2°/min. A peak intensity ratio $I_\beta$/Ta corresponding to the above-described Formula (2): $0.1 < I_\beta/I_\alpha \leq 2.0$ was calculated for the peak α and the peak β observed in the obtained diffraction spectrum.

<TEM-EDS Observation>

The active material powders obtained in Examples 1 to 12 and Comparative Examples 1 to 5 were observed by TEM-EDS to examine the distributions of respective crystals in the material having the single phase or mixed-phase in the primary particle.

The synthesis conditions and various measurement results of the niobium-titanium composite oxides in each of the examples are summarized in the following Table 1.

As the synthesis conditions, the mixing ratio (molar ratio) of the raw materials (Nb$_2$O$_5$ and TiO$_2$), and the firing temperature and firing time in the high temperature heat treatment (third firing) are shown. In Examples 9 to 12, in addition to Nb$_2$O$_5$ and TiO$_2$, one or more of Ta$_2$O$_5$, K$_2$CO$_3$, and H$_3$PO$_4$ were added but omitted in Table 1 since they were small in amount. In Comparative Examples 1 to 2, the mixing ratios of the raw materials are indicated in two sets, since the particles formed of single phase of the Nb$_2$TiO$_7$-phase and the particles formed of single phase of the Nb$_{10}$Ti$_2$O$_{29}$-phase each were separately synthesized. In each of them, the upper row shows the ratio of raw materials in the synthesis of the Nb$_2$TiO$_7$ phase particles, and the lower row shows the ratio of raw materials in the synthesis of the Nb$_{10}$Ti$_2$O$_{29}$ phase particles.

As the measurement results, there are shown: the crystal phase determined by the powder X-ray diffraction measurement, the ratio (mass ratio) of each crystal phase, the ratio ($A_{Nb}/A_{Ti}$) of the Nb abundance to the Ti abundance calculated based on the crystal phase, and the peak intensity ratio $I_\beta/I_\alpha$ calculated by Formula (2); and the distribution of each crystal examined by the TEM-EDS observation. As for the crystal phase, the A-type niobium-titanium composite oxide phase is denoted by "Nb$_2$TiO$_7$", and the B-type niobium-titanium composite oxide phase is denoted by "Nb$_{10}$Ti$_2$O$_{29}$". The ratio of these phases in the powder is indicated by the mass ratio $M_A/M_B$ of the former to the latter together with the mass proportion expressed as a percentage. For Examples 9 to 12, addition amounts of added Ta, K, and P are also shown.

TABLE 1

| | Raw material Mol ratio Nb$_2$O$_5$:TiO$_2$ | High temperature heat treatment Temperature, Time | Crystal phase (mass %) | $A_{Nb}/A_{Ti}$ | $I_\beta/I_\alpha$ | $M_A/M_B$ | Distribution of crystal phase within primary particles |
|---|---|---|---|---|---|---|---|
| Example 1 | 1.7:1 | 1475° C., 1 h | Nb$_2$TiO$_7$ (33.4) Nb$_{10}$Ti$_2$O$_{29}$ (66.6) | 3.4 | 1.48 | 0.5 | uniform |
| Example 2 | 1.65:1 | 1475° C., 1 h | Nb$_2$TiO$_7$ (37.8) Nb$_{10}$Ti$_2$O$_{29}$ (62.2) | 3.3 | 1.15 | 0.61 | uniform |
| Example 3 | 1.5:1 | 1475° C., 1 h | Nb$_2$TiO$_7$ (48.3) Nb$_{10}$Ti$_2$O$_{29}$ (51.7) | 3 | 0.82 | 0.93 | uniform |

TABLE 1-continued

| | Raw material Mol ratio $Nb_2O_5:TiO_2$ | High temperature heat treatment Temperature, Time | Crystal phase (mass %) | $A_{Nb}/A_{Ti}$ | $I_\beta/I_\alpha$ | $M_A/M_B$ | Distribution of crystal phase within primary particles |
|---|---|---|---|---|---|---|---|
| Example 4 | 1.4:1 | 1475° C., 1 h | $Nb_2TiO_7$ (56.4) $Nb_{10}Ti_2O_{29}$ (43.6) | 2.8 | 0.41 | 1.29 | uniform |
| Example 5 | 1.25:1 | 1475° C., 1 h | $Nb_2TiO_7$ (71.4) $Nb_{10}Ti_2O_{29}$ (28.6) | 2.5 | 0.26 | 2.5 | uniform |
| Example 6 | 1.25:1 | 1500° C., 2 h | $Nb_2TiO_7$ (71.4) $Nb_{10}Ti_2O_{29}$ (28.6) | 2.5 | 0.11 | 2.5 | uniform |
| Example 7 | 2:1 | 1475° C., 1 h | $Nb_2TiO_7$ (21.3) $Nb_{10}Ti_2O_{29}$ (78.7) | 3.9 | 1.97 | 0.27 | uniform |
| Example 8 | 1.15:1 | 1475° C., 1 h | $Nb_2TiO_7$ (79.6) $Nb_{10}Ti_2O_{29}$ (20.4) | 2.3 | 0.13 | 3.9 | uniform |
| Example 9 | 1.5:1 | 1475° C., 1 h | $Nb_2TiO_7$ (48.3) $Nb_{10}Ti_2O_{29}$ (51.7) + Ta 200 mol ppm | 3 | 0.82 | 0.93 | uniform |
| Example 10 | 1.5:1 | 1475° C., 1 h | $Nb_2TiO_7$ (48.3) $Nb_{10}Ti_2O_{29}$ (51.7) + K 1000 mol ppm | 3 | 0.82 | 0.93 | uniform |
| Example 11 | 1.5:1 | 1475° C., 1 h | $Nb_2TiO_7$ (48.3) $Nb_{10}Ti_2O_{29}$ (51.7) + P 1500 mol ppm | 3 | 0.82 | 0.93 | uniform |
| Example 12 | 1.5:1 | 1475° C., 1 h | $Nb_2TiO_7$ (48.3) $Nb_{10}Ti_2O_{29}$ (51.7) + Ta 500 mol ppm + K 1000 mol ppm + P 1500 mol ppm | 3 | 0.82 | 0.93 | uniform |
| Comparative Example 1 | 1:1 2.5:1 | none | $Nb_2TiO_7$ (99.5) $Nb_{10}Ti_2O_{29}$ (0.5) | 2.01 | 0.08 | 199 | single phases in all |
| Comparative Example 2 | 1:1 2.5:1 | none | $Nb_2TiO_7$ (50.0) $Nb_{10}Ti_2O_{29}$ (50.0) | 2.95 | 2.9 | 1 | single phases in all |
| Comparative Example 3 | 1.5:1 | none | $Nb_2TiO_7$ (47.5) $Nb_{10}Ti_2O_{29}$ (52.5) | 3.01 | 3.2 | 0.9 | not uniform |
| Comparative Example 4 | 1.25:1 | 1600° C., 2 h | $Nb_2TiO_7$ (71.4) $Nb_{10}Ti_2O_{29}$ (28.6) | 2.5 | 0.07 | 2.5 | uniform |
| Comparative Example 5 | 2.2:1 | 1475° C., 1 h | $Nb_2TiO_7$ (10.5) $Nb_{10}Ti_2O_{29}$ (89.5) | 4.4 | 2.2 | 0.12 | uniform |

As shown in Table 1, in all of the active material powders of Examples 1 to 12, the A-type niobium-titanium composite oxide phase ($Nb_2TiO_7$-type phase) and the B-type niobium-titanium composite oxide phase ($Nb_{10}Ti_2O_{29}$-type phase) coexisted in each of the primary particle, and both of the above-described Formula (1): $2.3 \leq A_{Nb}/A_{Ti} \leq 4.0$ and Formula (2): $0.1 < I_\beta/I_\alpha \leq 2.0$ were satisfied. Furthermore, among these Examples, Examples 1 to 7 and 9 to 12 satisfied the above-described Formula (3): $0.5 \leq M_A/M_B \leq 2.5$ as well. In addition, in Examples 1 to 12, both the crystal phases of the A-type niobium-titanium composite oxide phase and the B-type niobium-titanium composite oxide phase were uniformly distributed in each primary particle.

In contrast, the active material powders of Comparative Examples 1 to 5 each did not satisfy at least one of Formulae (1) and (2). Furthermore, in Comparative Examples 1 and 2, all the primary particles contained only the single phase of the $Nb_2TiO_7$ phase or the single phase of the $Nb_{10}Ti_2O_{29}$ phase, and hence it can be said that the active material powders as a whole were in a state being separated into these two phases. In Comparative Example 3, an uneven and non-uniform distribution was confirmed by TEM-EDS, in which the $Nb_2TiO_7$ phase was concentrated towards the center of the primary particle and the $Nb_{10}Ti_2O_{29}$ phase was abundantly present on the surface side of the particle. For the active material powder of Comparative Example 4, it was confirmed that a low crystallinity was obtained, since there was observed an X-ray diffraction spectrum in which the value of the peak intensity ratio $I_\beta/I_\alpha$ was small. In Comparative Example 5, the proportion (mass ratio) of the B-type niobium-titanium composite oxide phase was too large.

<Electrochemical Measurement>

First, 100 parts by mass of the niobium-titanium composite oxide powder obtained in each example, 10 parts by mass of acetylene black and 5 parts by mass of carbon nanofibers as electro-conductive agents, and 10 parts by mass of polyvinylidene fluoride (PVdF) as a binder were added to and mixed with N-methylpyrrolidone (NMP) to obtain a slurry. This slurry was applied onto one surface of a current collector made of an aluminum foil having a thickness of 12 μm and dried, then was pressed, whereby an electrode having an electrode density (density of the active material-containing layer excluding the current collector) of 2.4 g/cm³ was fabricated.

Next, an electrolytic solution was prepared by dissolving $LiPF_6$ as a supporting salt at a concentration of 1 mol/L in a mixed solvent in which ethylene carbonate (EC) and diethyl carbonate (DEC) were mixed at a volume ratio of 1:2.

The obtained electrode was used as a working electrode and Li metal was used as a counter electrode and a reference electrode to fabricate a three-electrode-type beaker cell using the obtained electrolytic solution, and the electrochemical performance thereof was evaluated.

In the electrochemical measurement, since lithium metal is used as a counter electrode in the three-electrode-type beaker cell for measurement, the potentials of electrodes using active materials of the Examples and Comparative Examples are more noble than those of the counter electrodes. Therefore, each working electrode operates as a positive electrode. That is, the definition of charge and discharge is opposite to the definition of the case when the electrodes according to Examples and Comparative Examples are used as negative electrodes. Here, for the sake of avoiding confusion, in this electrochemical measurement, a direction in which lithium ions are inserted into the electrode is consistently referred to as charge, and a direction in which lithium ions are extracted is consistently referred to as discharge. Note that, the active material of the present embodiment operates as a negative electrode when put in combination with a known positive electrode material.

The fabricated electrochemical measurement cell was charged and discharged in a potential range of from 1.0 V to 3.0 V (vs. Li/Li$^+$) relative to the lithium metal electrode as a reference. The charge/discharge current value was set to 0.2 C (hourly discharge rate), and the examination of 0.2 C discharge capacity was performed at room temperature. The value of 0.2 C discharge capacity is an index of the energy density.

Next, in order to examine the input/output performance and the cycle life performance for a battery, a nonaqueous electrolyte battery (rated capacity: 1000 mAh) was fabricated by the procedure described later using the active material powders obtained in Examples 1 to 12 and Comparative Examples 1 to 5.

(Fabrication of Negative Electrode)

To NMP were added 100 parts by mass of the active material powder obtained in Examples 1 to 12 and Comparative Examples 1 to 5, 10 parts by mass of acetylene black and 5 parts by mass of carbon nanofibers as electro-conductive agents, and 10 parts by mass of PVdF as a binder, and then mixed to obtain a slurry. This slurry was applied onto both surfaces of a current collector made of an aluminum foil having a thickness of 12 μm, and was dried under vacuum at 130° C. for 12 hours to obtain a stack. Thereafter, the stack was pressed so that an active material-containing layer (excluding the current collector) had a density of 2.4 g/cm$^3$, and thus a negative electrode was obtained.

(Fabrication of Positive Electrode)

Acetylene black as an electro-conductive agent was mixed at a proportion of 5% by mass with a commercially-available lithium cobalt oxide (LiCoO$_2$) to obtain a mixture. Subsequently, this mixture was dispersed in NMP to obtain a dispersion solution. This dispersion solution was mixed with PVdF as a binder at a proportion of 5% by mass relative to the lithium cobalt oxide to prepare a positive electrode slurry. Using a blade, this slurry was applied onto both surfaces of a current collector made of a 12 μm aluminum foil. The current collector onto which the slurry was applied was dried under vacuum at 130° C. for 12 hours to obtain a stack. Subsequently, the stack was pressed so that an active material-containing layer (excluding the current collector) had a density of 2.2 g/cm$^3$, and thus a positive electrode was obtained.

(Fabrication of Electrode Group)

The positive electrode and the negative electrode fabricated as described above were stacked with a polyethylene separator interposed therebetween to obtain a stack. Subsequently, the stack was wound and then pressed, whereby a wound electrode group having a flat shape was obtained. To this electrode group were connected a positive electrode terminal and a negative electrode terminal.

(Preparation of Nonaqueous Electrolyte)

A mixed solvent of EC and DEC (volume ratio 1:1) was prepared as a mixed solvent. Into this solvent was dissolved lithium hexafluorophosphate (LiPF$_6$) at a concentration of 1 M. Thus, a nonaqueous electrolyte was prepared.

(Assembly of Nonaqueous Electrolyte Battery)

The electrode group fabricated as described above was placed in a battery container member made of a laminated film containing aluminum. The nonaqueous electrolyte was put into the container member, and then the container member was sealed by heat sealing, whereby a nonaqueous electrolyte battery was produced.

(Charge-Discharge Test)

Using the obtained laminated battery, an input/output test was performed. The cell was charged to a charge state of half the rated capacity so as to have the SOC be 50%. Subsequently, measurement of the pulse input/output performance for 10 seconds at a 10 C rate within the range of cell voltage from 1.5 V to 3.0 V was performed. Taking the input value (W) and the output value (W) obtained upon this measurement, the output value was divided by the input value, whereby the balance of the input/output performance was calculated. The closer this value is 1.0, the cell can be better regarded an ideal cell having well-balanced input/output performance.

Next, an accelerated life test was performed at 45° C. In the life test, 300 cycles of repeated charge and discharge were performed (a charge and a discharge makes up 1 cycle) at a charge/discharge current value of 0.2 C (hourly discharge rate) within a potential range of from 1.5 V to 3.0 V in cell voltage, whereby a discharge capacity retention ratio after 300 cycles was investigated. The discharge capacity after 300 cycles was divided by an initial discharge capacity and then multiplied by 100, whereby a cycle capacity retention ratio (%) was calculated for the case where the initial charge/discharge capacity was defined as 100%.

The results of the electrochemical measurements are summarized in Table 2 below. Specifically, there are shown the value of the 0.2 C discharge capacity for the three-electrode-type beaker cell using the working electrode prepared with the active material powder according to each example, and the results of the input/output test and the life test for the nonaqueous electrolyte battery using the negative electrode prepared with each active material powder. The results of the input/output test and the life test are, namely, the balance of the input/output performance (output/input performance ratio) and the capacity retention ratio after 300 cycles (=[discharge capacity after 300 cycles/initial discharge capacity]×100%), respectively.

TABLE 2

| | 0.2 C discharge capacity (mAh/g) | Input/output performance ratio | Cycle capacity retention ratio (%) |
| --- | --- | --- | --- |
| Example 1 | 261 | 0.72 | 93.5 |
| Example 2 | 264 | 0.7 | 92.8 |
| Example 3 | 271 | 0.68 | 92.4 |
| Example 4 | 272 | 0.65 | 91.7 |
| Example 5 | 273 | 0.63 | 90.3 |
| Example 6 | 273 | 0.6 | 89.5 |
| Example 7 | 255 | 0.74 | 86.6 |
| Example 8 | 275 | 0.54 | 86.3 |
| Example 9 | 271 | 0.69 | 93.3 |
| Example 10 | 270 | 0.69 | 92.9 |
| Example 11 | 270 | 0.69 | 92.8 |

TABLE 2-continued

|  | 0.2 C discharge capacity (mAh/g) | Input/output performance ratio | Cycle capacity retention ratio (%) |
|---|---|---|---|
| Example 12 | 271 | 0.7 | 93.1 |
| Comparative Example 1 | 266 | 0.42 | 72.2 |
| Comparative Example 2 | 252 | 0.45 | 73.4 |
| Comparative Example 3 | 262 | 0.43 | 81.9 |
| Comparative Example 4 | 269 | 0.39 | 76.3 |
| Comparative Example 5 | 255 | 0.73 | 79.1 |

As shown in Table 2, the results of the electrochemical measurement (0.2 C discharge capacity, output/input performance ratio, and cycle capacity retention ratio) for the active material powders according to Examples 1 to 12 were all excellent. From these results, it can be seen that the active material powders according to Examples 1 to 12 each have a high energy density, are well balanced in input/output performance, and are moreover excellent in terms of cycle life performance. Specifically, in Examples 1 to 12, while maintaining an energy density (0.2 C discharge capacity) equivalent to or higher than that of Comparative Examples 1 to 5, the input/output performance (output/input performance ratio) was more well-balanced and the cycle life performance (cycle capacity retention ratio) was more excellent.

According to at least one embodiment and example described above, an active material is provided. The active material includes a niobium-titanium composite oxide. In the active material, a ratio $A_{Nb}/A_{Ti}$ of a Nb abundance $A_{Nb}$ to a Ti abundance $A_{Ti}$ satisfies $2.3 \leq A_{Nb}/A_{Ti} \leq 4.0$, and an intensity ratio $I_\beta/I_\alpha$ between a peak intensity $I_\alpha$ of a peak α appearing at $8.5° \leq 2\theta \leq 9.0°$ in a powder X-ray diffraction spectrum using a Cu-Kα ray, and a peak intensity $I_\beta$ of a peak β appearing at $12.50° \leq 2\theta \leq 13.0°$ is within a range of $0.1 < I_\beta/I_\alpha \leq 2.0$. The active material can realize a secondary battery that can have a balanced input/output performance and exhibit excellent cycle life performance, while maintaining high energy density. In addition, with the active material, an electrode that can realize a secondary battery exhibiting such performance, a secondary battery and battery pack exhibiting such a performance, and a vehicle having the battery pack installed thereon can be provided.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. An active material comprising a crystal particle, the crystal particle comprising a niobium-titanium composite oxide,
   the crystal particle comprising an A-type niobium-titanium composite oxide phase and a B-type niobium-titanium composite oxide phase in a state of distribution where a boundary is not observed within a primary particle of the active material, and where the A-type niobium-titanium composite oxide phase and the B-type niobium-titanium composite oxide phase are homogenized at a molecular level within the crystal particle,
   a ratio $A_{Nb}/A_{Ti}$ of a Nb abundance $A_{Nb}$ to a Ti abundance $A_{Ti}$ in the crystal particle satisfying $2.3 \leq A_{Nb}/A_{Ti} \leq 4.0$, and
   according to a powder X-ray diffraction spectrum using a Cu-Kα ray for the crystal particle, an intensity ratio $I_\beta/I_\alpha$ of a peak intensity $I_\beta$ of a peak β appearing at $12.5° \leq 2\theta \leq 13.0°$ attributed to the B-type niobium-titanium composite oxide phase to a peak intensity $I_\alpha$ of a peak α appearing at $8.5° < 2\theta \leq 9.0°$ attributed to the A-type niobium-titanium composite oxide phase is within a range of $0.1 < I_\beta/I_\alpha \leq 2.0$.

2. The active material according to claim 1, wherein a mass ratio $M_A/M_B$ of a mass proportion $M_A$ of the A-type niobium-titanium composite oxide phase to a mass proportion $M_B$ of the B-type niobium-titanium composite oxide phase is within a range of $0.5 \leq M_A/M_B \leq 2.5$.

3. The active material according to claim 1, wherein the niobium-titanium composite oxide comprises one or more selected from the group consisting of Ta, K, and P.

4. An electrode comprising the active material according to claim 1.

5. The electrode according to claim 4, comprising an active material-containing layer, the active material-containing layer containing the active material.

6. A secondary battery comprising:
   a negative electrode;
   a positive electrode, and
   an electrolyte,
   the negative electrode comprising the electrode according to claim 4.

7. A battery pack comprising the secondary battery according to claim 6.

8. The battery pack according to claim 7, further comprising an external power distribution terminal and a protective circuit.

9. The battery pack according to claim 7, comprising plural of the secondary battery, the secondary batteries being electrically connected in series, in parallel, or in combination of in-series connection and in-parallel connection.

10. A vehicle comprising the battery pack according to claim 7.

11. The vehicle according to claim 10, wherein the vehicle comprises a mechanism configured to convert kinetic energy of the vehicle into regenerative energy.

12. The active material according to claim 1, wherein the A-type niobium-titanium composite oxide phase is a $Nb_2TiO_7$-type crystal phase and the B-type niobium-titanium composite oxide phase is a $Nb_{10}Ti_2O_{28}$-type crystal phase.

* * * * *